US009829893B2

(12) United States Patent
Kawamata et al.

(10) Patent No.: US 9,829,893 B2
(45) Date of Patent: Nov. 28, 2017

(54) OPERATION MANAGEMENT SYSTEM FOR DUMP TRUCKS

(71) Applicant: HITACHI CONSTRUCTION MACHINERY CO., LTD., Tokyo (JP)

(72) Inventors: Yukihiro Kawamata, Tokyo (JP); Hiroto Morizane, Tokyo (JP); Tomoyuki Hamada, Tsuchiura (JP); Hidefumi Ishimoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/021,815

(22) PCT Filed: Oct. 16, 2014

(86) PCT No.: PCT/JP2014/077495
§ 371 (c)(1),
(2) Date: Mar. 14, 2016

(87) PCT Pub. No.: WO2015/060179
PCT Pub. Date: Apr. 30, 2015

(65) Prior Publication Data
US 2016/0231750 A1     Aug. 11, 2016

(30) Foreign Application Priority Data
Oct. 25, 2013   (JP) .................. 2013-222601

(51) Int. Cl.
G06Q 50/02     (2012.01)
G01C 21/32     (2006.01)
(Continued)

(52) U.S. Cl.
CPC ........... *G05D 1/0297* (2013.01); *G01C 21/32* (2013.01); *G01C 21/3407* (2013.01);
(Continued)

(58) Field of Classification Search
CPC .. G06Q 50/02; G09B 29/106; B60R 16/0231; B60K 31/0058; G01C 21/32
See application file for complete search history.

(56) References Cited

U.S. PATENT DOCUMENTS

2002/0173881 A1*  11/2002  Lash .................. B60K 31/0058
                                                         701/1
2004/0122576 A1*   6/2004  Sorrells ............... B60R 16/0231
                                                         701/50
(Continued)

FOREIGN PATENT DOCUMENTS

JP   2008-014673 A   1/2008
JP   2008-210087 A   9/2008

OTHER PUBLICATIONS

International Preliminary Report on Patentability received in corresponding International Application No. PCT/JP2014/077495 dated May 6, 2016.
(Continued)

Primary Examiner — Yuri Kan
(74) Attorney, Agent, or Firm — Mattingly & Malur, PC

(57) ABSTRACT

An operation management system for dump trucks includes a storage device 130, 170 in which map data indicative of a road map for dump trucks are stored, a plurality of dump trucks 200 configured to travel based on the map data, and a control device 100, 150 configured to permit, upon updating of part 510 of the map data, updating of the part of the map data when, although the part of the map data is included in any of a plurality of mining fields 400, 330, 460, no dump truck exists in any of the plurality of mining fields.

8 Claims, 35 Drawing Sheets

(51) Int. Cl.
   *G05D 1/02* (2006.01)
   *G06Q 50/30* (2012.01)
   *G08G 1/137* (2006.01)
   *G09B 29/10* (2006.01)
   *G06Q 10/08* (2012.01)
   *G09B 29/00* (2006.01)
   *G01C 21/34* (2006.01)
   *G08G 1/00* (2006.01)

(52) U.S. Cl.
   CPC ............ *G06Q 10/08* (2013.01); *G06Q 50/02* (2013.01); *G06Q 50/30* (2013.01); *G08G 1/137* (2013.01); *G08G 1/20* (2013.01); *G09B 29/007* (2013.01); *G09B 29/10* (2013.01); *G05D 2201/0202* (2013.01); *G08G 1/00* (2013.01)

(56) References Cited

U.S. PATENT DOCUMENTS

| | | | |
|---|---|---|---|
| 2006/0271281 A1* | 11/2006 | Ahn | G09B 29/106 |
| | | | 701/532 |
| 2007/0126605 A1* | 6/2007 | Aleksic | G01C 21/32 |
| | | | 340/995.14 |
| 2008/0033639 A1* | 2/2008 | Nakamura | G01C 21/32 |
| | | | 701/532 |

OTHER PUBLICATIONS

International Search Report of PCT/JP2014/077495 dated Nov. 25, 2014.

* cited by examiner

FIG. 9

| ROAD LINK ID (1310) | ROAD SHAPE (1320) |
|---|---|
| 100 | (500, 600) (510, 601) (514, 622) (515, 620) |
| 101 | (5150, 620) (517, 630) (514, 641) (520, 645) |
| ⋮ | ⋮ |

| ROAD LINK ID (1410) | MINING FIELD AREA (1420) |
|---|---|
| 100 | MINING FIELD AREA A |
| 101 | MINING FIELD AREA A |
| ⋮ | ⋮ |

| ROAD LINK ID | SPEED LIMIT |
|---|---|
| 100 | 20 km/h |
| 101 | 25 km/h |
| ⋮ | ⋮ |

| ROAD LINK ID | GRADIENT |
|---|---|
| 100 | 2 DEGREES |
| 101 | 0 DEGREES |
| ⋮ | ⋮ |

| ROAD LINK ID | CURVATURE |
|---|---|
| 100 | R=800 |
| 101 | R=1000 |
| ⋮ | ⋮ |

FIG. 14

| ROAD LINK ID | ROAD SURFACE RESISTANCE |
|---|---|
| 100 | 0.15 |
| 101 | 0.20 |
| ⋮ | ⋮ |

FIG. 15

| MINING DUMP TRUCK ID (1210) | POSITION (1220) | POSITIONING TIME (1230) |
|---|---|---|
| 420 | (500, 600) | 2012/12/12 15::00:01 |
| 422 | (521, 630) | 2012/12/12 15::00:01 |
| 450 | (301, 300) | 2012/12/12 15::00:01 |
| 452 | (321, 331) | 2012/12/12 15::00:01 |
| 480 | (101, 102) | 2012/12/12 15::00:01 |
| 482 | (123, 112) | 2012/12/12 15::00:01 |
| 484 | (141, 111) | 2012/12/12 15::00:01 |
| ⋮ | ⋮ | ⋮ |

1200

AUTOMOTIVE TERMINAL SYSTEM:
TRANSMISSION PROCESS OF OWN VEHICLE
POSITION AT PRESENT TO CENTER

AUTOMOTIVE TERMINAL SYSTEM:
REGISTRATION PROCESS OF CURRENT
POSITION OF MINING DUMP TRUCK

ROAD LINK CHANGE

FIG. 30

| TRAVEL ROUTE ID 3010 | ROAD LINK SET OF TRAVEL ROUTES 3020 | POINT OF DEPARTURE 3030 | PLACE OF DESTINATION 3040 | MINING DUMP TRUCK WHILE TARAVELING 3050 |
|---|---|---|---|---|
| 2710 | (100, 101, 102, 105, 106, 107, 200, 220) | 378 | 364 | 380 |
| 2720 | (220, 200, 107, 108, 109, 130, 131, 132) | 364 | 374 | 382 |
| | | | | |
| | | | | |
| ......... | ......... | ......... | | |

3000

OPERATION MANAGEMENT SYSTEM FOR DUMP TRUCKS

TECHNICAL FIELD

The present invention relates to an operation management system for dump trucks.

BACKGROUND ART

An operation management system for dump trucks performs traveling control of a dump truck based on map data that are data of a road map for dump trucks. The operation management system for dump trucks comprises, an autonomous traveling system which performs traveling control of a dump truck based on own position information obtained from a positioning device such as a GPS receiver installed in the dump truck and map data of a road map available for dump trucks thereby to allow the dump truck to autonomously travel.

Map data used in an operation management system occasionally include information on road shapes that is a target path upon traveling, and speed limit information assigned to the roads and representing a target speed upon traveling. Among autonomous traveling systems, one of them achieves following travel control utilizing such road shape information and speed limit information as described above and own position information of a vehicle measured by a positioning device (US 2004-0122576 A1).

PRIOR ART DOCUMENT

Patent Document

Patent Document 1: US 2004-0122576 A1

SUMMARY OF THE INVENTION

Problems to be Solved by the Invention

In the mine site, a mining dump truck of an ultra-large type is utilized, together with a development of the mining procedure of extension, addition, abolition, temporary closure and forth of roads (transportation paths) mining dump trucks can travel occur frequently. Therefore, also updating of map data is performed frequently.

However, in a conventional operation management system, map data over overall area of the mine site are managed in a concentrated manner by a computer in a control center. Therefore, when the map data are to be updated, it is necessary to update the map data of the control center and all dump trucks in the mine site after operation of the dump trucks is stopped including also a case in which the mine site is configured from a plurality of mining fields. Therefore, it is concerned that the operational efficiency of the mine may be degraded.

It is an object of the present invention to provide an operation management system for dump trucks wherein avoiding to stop operation of all dump trucks that are under the management thereby every time map data are updated.

Means for Solving the Problem

In order to attain the object described above, according to the present invention, there is provided an operation management system for dump trucks, including a storage device in which map data indicative of a road map available for dump trucks are stored, a plurality of dump trucks configured to travel based on the map data, and a control device configured to permit, upon updating of part of the map data, updating of the part of the map data when the part of the map data is not included in one or more given closed regions set in advance on the road map or when, although the part of the map data is included in any of the one or more closed regions, none of the plurality of dump trucks exists in any of the one or more closed regions. Consequently, since the map data can be updated without stopping operation of all dump trucks, the work efficiency by the dump trucks can be improved.

Effect of the Invention

According to the present invention, upon updating of the map data, there is no necessity to stop all dump trucks that are under the management, and therefore, the work efficiency by the dump trucks can be improved.

BRIEF DESCRIPTION OF THE DRAWINGS

FIG. 9 is a road shape management table common to the embodiments.

FIG. 10 is a mining field area management table common to the embodiments.

FIG. 11 is a speed limit management table common to the embodiments.

FIG. 12 is a gradient management table common to the embodiments.

FIG. 13 is a curvature management table common to the embodiments.

FIG. 14 is a road surface resistance management table common to the embodiments.

FIG. 15 is a mining dump truck position management table common to the embodiments.

FIG. 30 is a travel route management table of the third to fifth embodiments.

MODES FOR CARRYING OUT THE INVENTION

In embodiments of the present invention described below, an autonomous traveling system for a mining dump truck that is one of operation management systems for a dump truck is configured such that, upon updating of map data used for autonomous traveling of mining dump trucks, not all mining dump trucks in a mine site are not stopped but operation of mining dump trucks that do not travel in a region relating to the updating is continued so that the map dating does not have an influence on operation of the mining dump trucks as far as possible. It is to be noted that, in the embodiments described below, a region in a mine site having one or more sets of a loading field and an unloading field connected to each other by a transport path (road) for a mining dump truck is defined as "mining field area (mining field)," and a mine site is partitioned into a plurality of mining field areas.

First Embodiment

First, a first embodiment of the present invention is described. In the present embodiment, an autonomous traveling system for a mining dump truck is configured such that management of map data is performed in a unit of a mining field area and map data are updated when a mining dump truck does not exist in a mining field area in which an updating location of map data is included. It is to be noted here that a mine site configured from a plurality of mining field areas is managed by a single control center.

Figure 1:
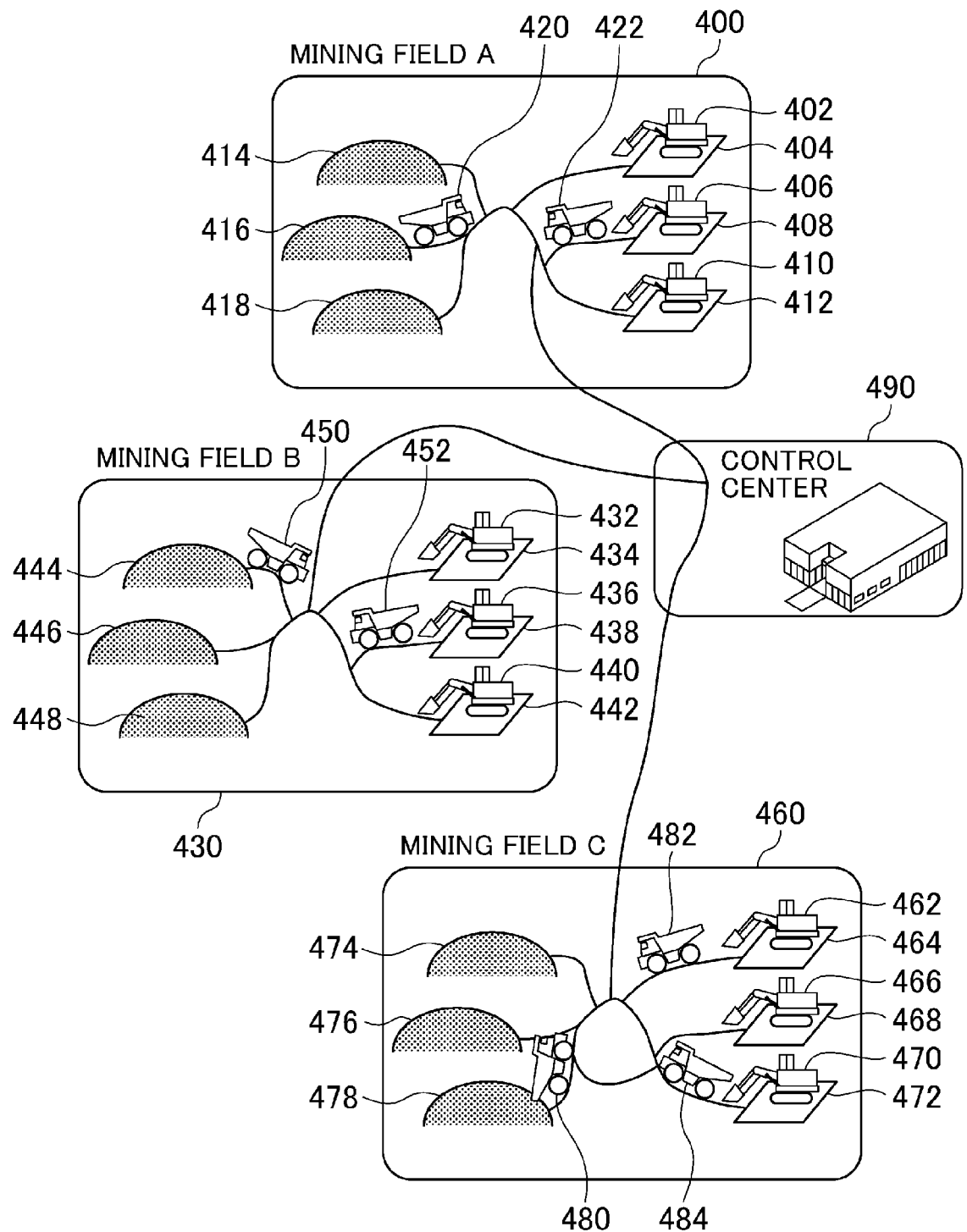
FIG. 1 is an explanatory view of a mining field area of a first embodiment.

A mining field area in the first embodiment is described. In the first embodiment, a mine site is managed by dividing the same into such mining field areas as a mine field A area 400, a mine field B area 430 and a mine field C area 460 as depicted in FIG. 1. A plurality of mining dump trucks placed under the management of a control center 490 repetitively perform a loading work, a transporting work and an unloading work in mining field areas individually allocated thereto.

The mine field A area 400 includes loading fields 404, 408 and 412 in which a loading work into mining dump trucks 420 and 422 by mining excavators 402, 406 and 410 that are hydraulic excavators of an ultra-large type, and unloading fields 414, 416 and 418 in which loads (dirt or minerals) having been loaded in the loading fields 404, 408 and 412 are unloaded. The loading fields 404, 408 and 412 and the unloading fields 414, 416 and 418 are connected to each other by transport paths (roads) for the mining dump trucks 420 and 422. Further, the mine field A area 400 is connected to the control center 490 by a transport path and is further connected to the mine field B area 430 and the mine field C area 460 by transport paths via the control center 490.

The mining excavator 402 is assigned to the loading field 404 and loads dirt or minerals into a mining dump truck. The mining excavator 406 is assigned to the loading field 408 and loads dirt or minerals into a mining dump truck. The mining excavator 410 is assigned to the loading field 412 and loads dirt or minerals into a mining dump truck.

The mining dump truck 420 and the mining dump truck 422 travel among the loading field 404, loading field 408, loading field 412 and the unloading field 414, unloading field 416 and unloading field 418 in the mine field A area 400 via the transport paths and transport dirt or minerals.

The mine field B area 430 includes loading fields 434, 438 and 442 in which a lording work into mining dump trucks 450 and 452 by mining excavators 432, 436 and 440 is performed, and unloading fields 444, 446 and 448 in which loads having been loaded in the loading fields 434, 438 and 442 are unloaded. The loading fields 434, 438 and 442 and the unloading fields 444, 446 and 448 are connected to each other by transport paths for the mining dump trucks 450 and 452. Further, the mine field B area 430 is connected to the control center 490 by a transport path and is further connected to the mine field A area 400 and the mine field C area 460 by transport paths via the control center 490.

The mining excavator 432 is assigned to the loading field 434 and loads dirt or minerals into a mining dump truck. The mining excavator 436 is assigned to the loading field 438 and loads dirt or minerals into a mining dump truck. The mining excavator 440 is assigned to the loading field 442 and loads dirt or minerals into a mining dump truck.

The mining dump truck 450 and the mining dump truck 452 travel among the loading field 434, loading field 438, loading field 442, unloading field 444, unloading field 446 and unloading field 448 in the mine field B area 430 through transport paths and transport dirt or minerals.

The mine field C area 460 includes loading fields 464, 468 and 472 in which a loading work into mining dump trucks 480 and 482 by mining excavators 462, 466 and 470 and unloading fields 474, 476 and 478 in which loads having been loaded in the loading fields 464, 468 and 472 are unloaded. The loading fields 464, 468 and 472 and the unloading fields 474, 476 and 478 are connected to each other by transport paths for the mining dump trucks 480, 482 and 484. Further, the mine field C area 460 is connected to the control center 490 by a transport path and is further connected to the mine field A area 400 and the mine field B area 430 by transport paths via the control center 490.

The mining excavator 462 is assigned to the loading field 464 and loads dirt or minerals into a mining dump truck. The mining excavator 466 is assigned to the loading field 468 and loads dirt or minerals into a mining dump truck. The mining excavator 470 is assigned to the loading field 472 and loads dirt or minerals into a mining dump truck.

The mining dump truck 480, mining dump truck 482 and mining dump truck 484 travel among the loading field 464, loading field 468, loading field 472, unloading field 474, unloading field 476 and unloading field 478 in the mine field C area 460 through transport paths and transport dirt or minerals.

Each mining dump truck has a mining field area in charge set in advance thereto and repetitively travels between a loading field and an unloading field in the same mining field area in order to perform transport traveling for dirt or minerals. In other words, basically it does not occur that a mining dump truck that travels one mining field area travels a different mining field area. Further, each mining dump truck sometimes travels to the control center 490 for the purpose of refueling, operator shift replacement (upon manned traveling of a dump truck) of a mining dump truck, movement to a parking place depending upon ending of a work, maintenance and so forth.

Figure 2:
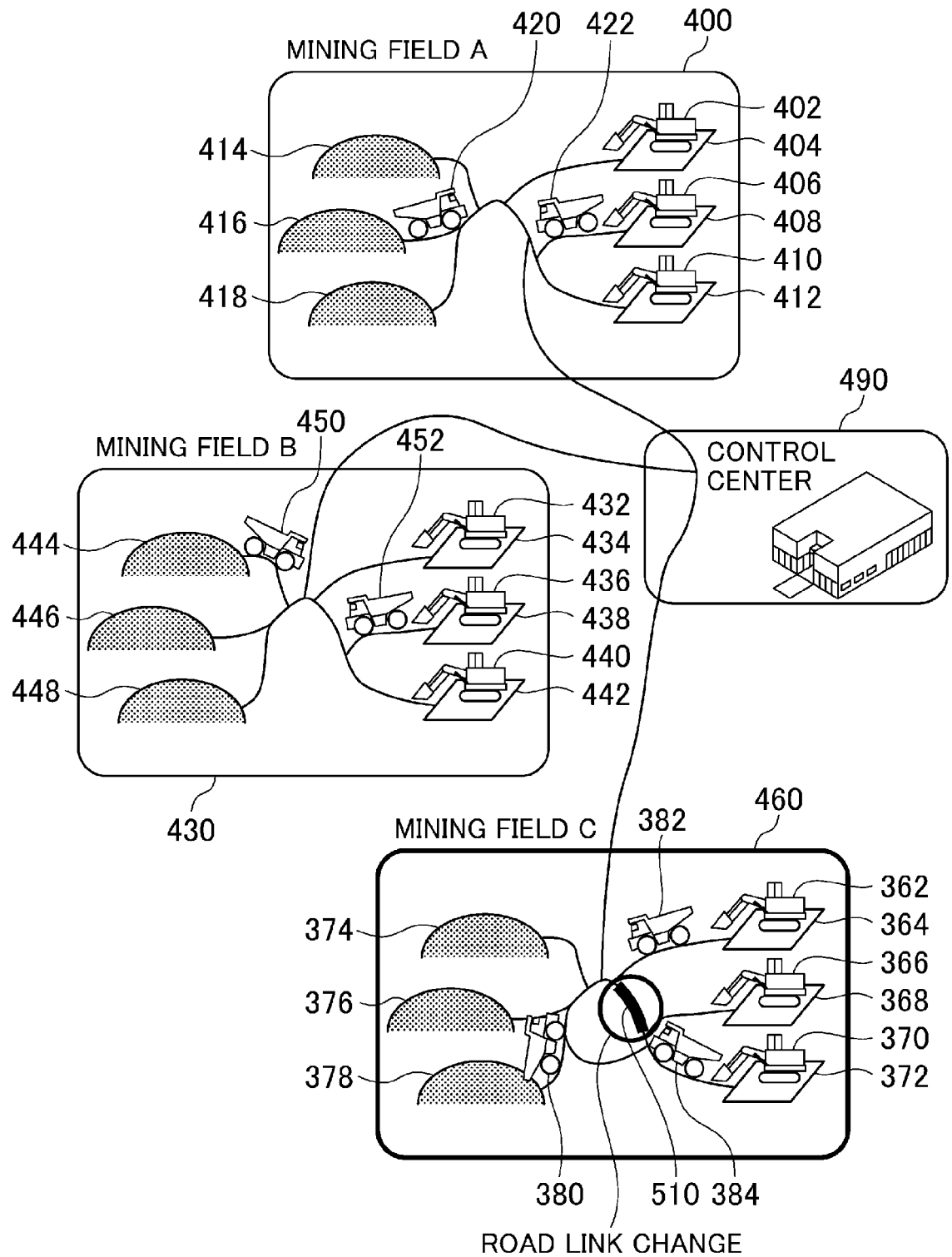
FIG. 2 is an explanatory view relating to map updating in the first embodiment.
Figure 3:
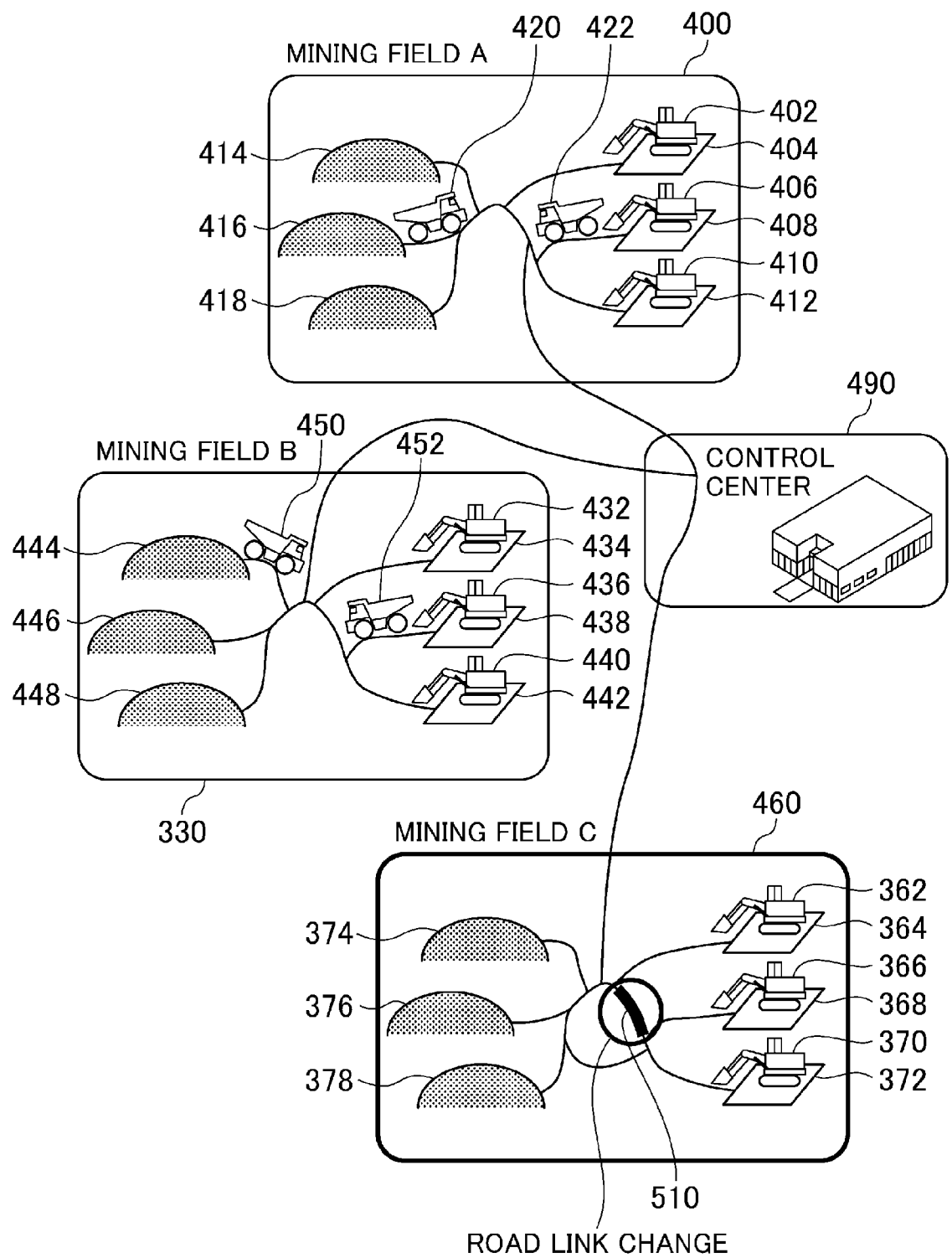
FIG. 3 is an explanatory view relating to map updating in the first embodiment.

In the first embodiment, a control center system 100 (refer to FIG. 4 hereinafter described) installed in the control center 490 decides, for example, when it is tried to change part (road link (details are hereinafter described)) of map data in the mine field C area 460 from within master map data managed by the control center system 100, whether or not there exists a mining dump truck in the mine field C area 460 in which the road link of a target of the change is included. Then, if mining dump trucks 380, 382 and 384 exist in the mine field C area 460 in which the road link (road link 510) of the change target is included as depicted in FIG. 2, updating of the master map data of the control center system 100 is not performed. On the other hand, if no mining dump truck exists in the mine field C area 460 in which the road link (road link 510) of the change target is included, then updating of the master map data is performed. Then, map data (automotive map data) managed by each mining dump truck are updated based on the master map data after updated. Consequently, upon map updating, updating of the map data can be performed without stopping operation of the mining dump trucks 420, 422, 450 and 452 in the mining field areas (mine field A area 400 and mine field B area 430) other than the mine field C area 460.

Figure 4:
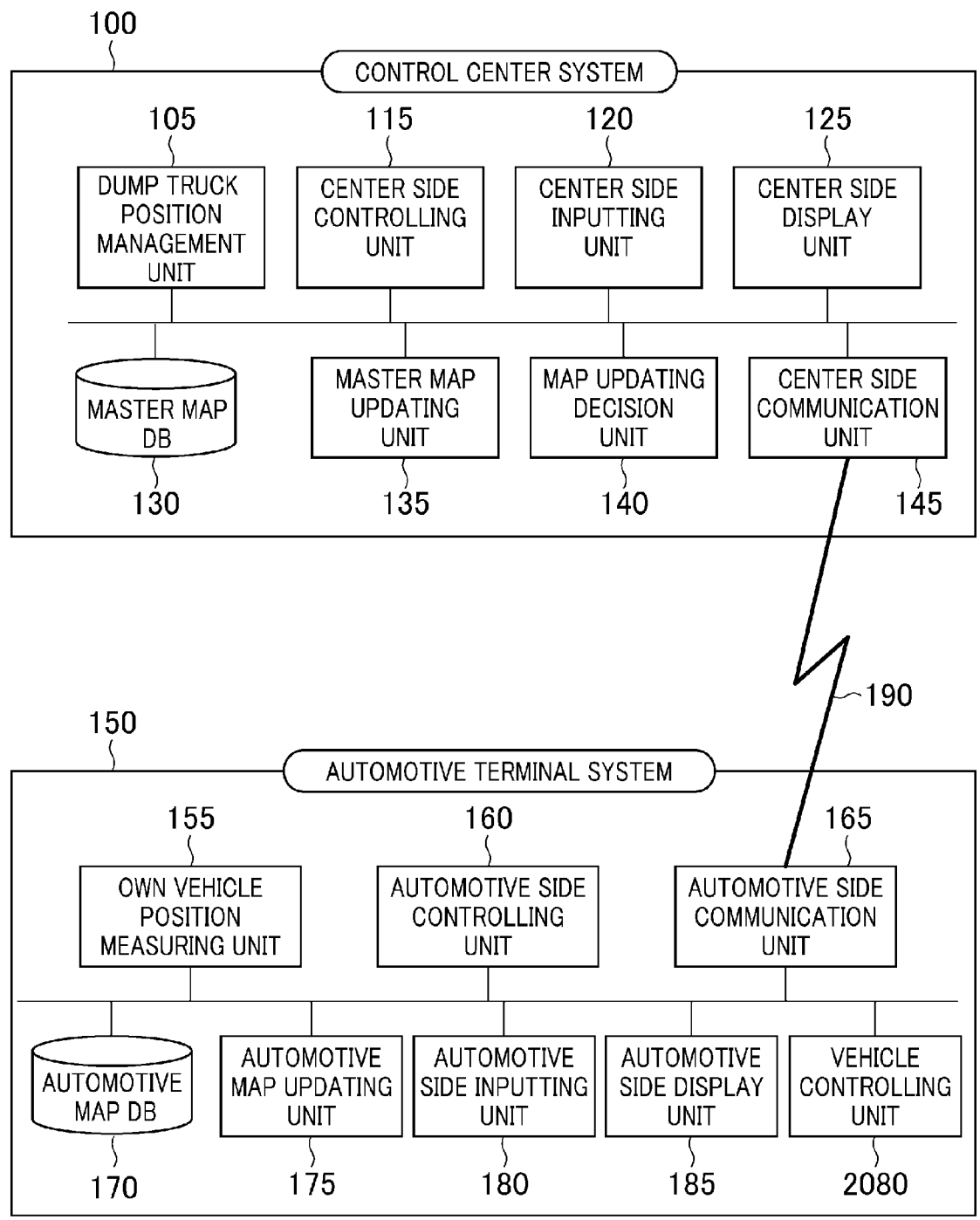
FIG. 4 is a system configuration diagram of the first embodiment.

A system configuration diagram in the first embodiment is depicted in FIG. 4. The operation management system for dump trucks depicted in FIG. 4 is configured from a control center system 100 installed in the control center 490 and an automotive terminal system 150 installed in the mining dump trucks 420, 422, 450, 452, 380, 382 and 384 in the mine site. The control center system 100 and the automotive terminal system 150 are connected to each other by a wireless communication network 190 and perform transfer of information therebetween. It is to be noted that, although actually a plurality of automotive terminal systems 150 exist because the automotive terminal system 150 is installed in each mining dump truck, only one is depicted in FIG. 4 omitting the others.

The control center system 100 is a control apparatus configured from a computer, and includes a dump truck position management unit 105 for managing an own vehicle position of a mining dump truck transmitted from each automotive terminal system 150, a master map DB (for example, a magnetic storage device) 130 for storing and managing master map data that are map data indicative of a map of roads for mining dump trucks in the mine site and are provided to each automotive terminal system 150, a master map updating unit 135 for updating the master map data managed by the master map DB, a map updating decision unit 140 for deciding whether or not updating of the master map data is permitted based on the position of the map data to be updated and the positions of the mining dump trucks, a center side communication unit (for example, a wireless communication apparatus) 145 for performing communication with the automotive terminal systems 150 through a communication network such as a wireless LAN, a center side inputting unit (for example, a mouse or a keyboard) 120 to be used by an operator in the control center 490 to perform an inputting operation upon updating of the master map data or the like, a center side display unit 125 (for example, a liquid crystal display) for performing information display to the operator, and a center side controlling unit 115 for performing general processing control of the control center system 100.

The automotive terminal system 150 is a control apparatus configured from a computer, and includes an own vehicle position measuring unit 155 for measuring the own vehicle position of the mining dump truck using a GPS device, an acceleration sensor, a gyroscope, a velocity sensor or the like, an automotive map DB (for example, a magnetic storage device) 170 that stores a master map provided from the master map DB 130 of the control center system 100 as automotive map data, an automotive map updating unit 175 for updating the automotive map data managed by the automotive map DB 170, an automotive side communication unit (for example, a wireless communication apparatus) 165 for performing communication with the control center system 100 through a communication network such as a wireless LAN, an automotive side inputting unit (for example, a keyboard) 180 for being used by an operator to perform an inputting operation, an automotive side display unit (for example, a liquid crystal display) 185 for displaying information for the operator, an automotive side controlling unit 160 for performing general processing control of the automotive terminal system 150, and a vehicle controlling unit 2080 for performing vehicle control such as acceleration, deceleration or stopping of the mining dump truck. The vehicle controlling unit 2080 performs autonomous traveling control for autonomously steering, accelerating or decelerating the vehicle based on an instruction received from the control center system 100, an own vehicle position measured by the own vehicle position measuring unit 155 and the automotive map data managed by the automotive map DB 170.

Figure 5:
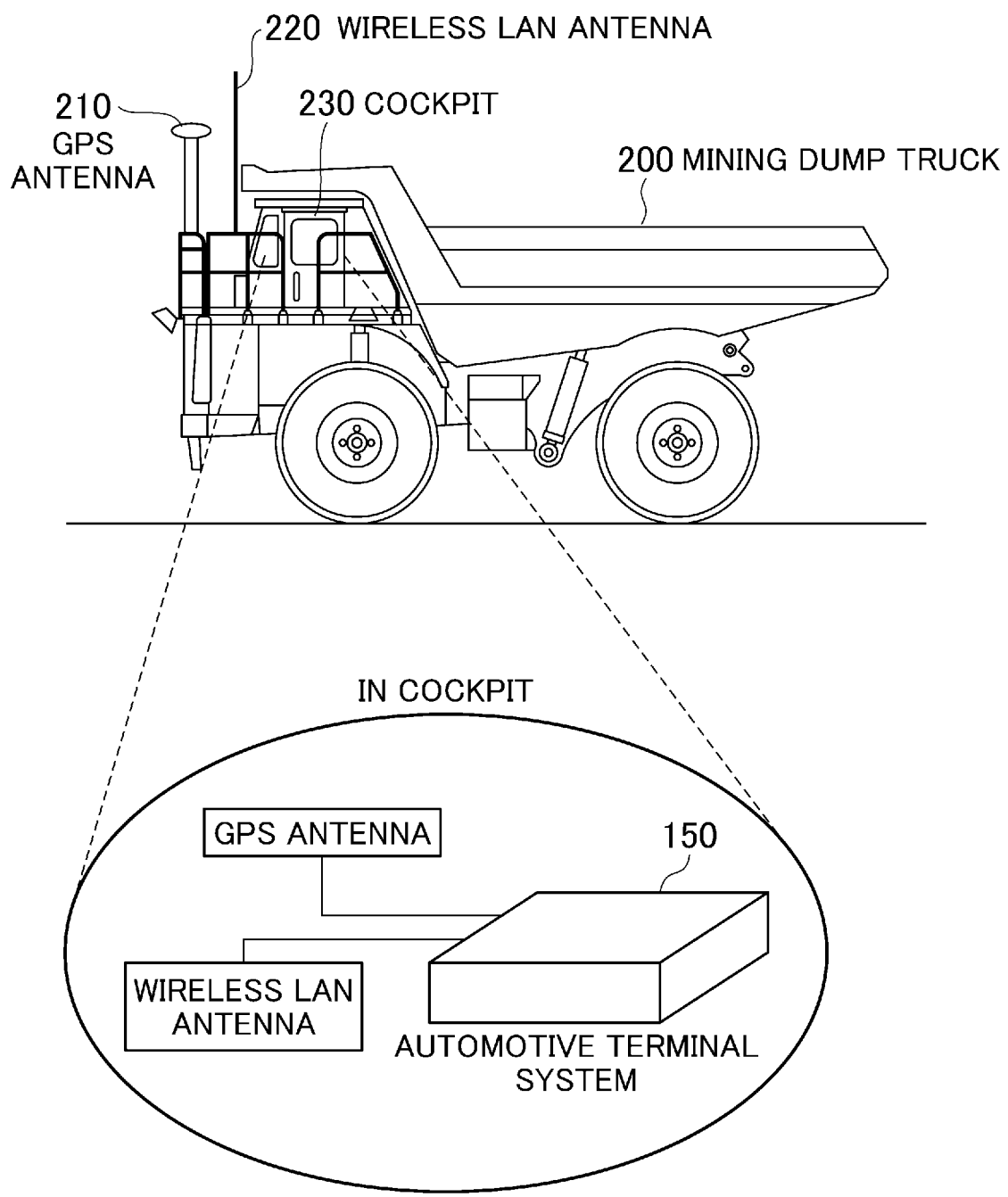
FIG. 5 is a schematic view of a configuration of a mining dump truck common to embodiments.

Now, a mining dump truck utilized in the operation management system according to the present embodiment is described with reference to FIG. 5. The mining dump truck 200 depicted in FIG. 5 has incorporated therein a GPS antenna 210 that receives navigation signals from a plurality of GPS satellites (navigation satellites) and outputs the navigation signals to the own vehicle position measuring unit 155 and a wireless LAN antenna 220 that receives an electric signal outputted from the control center 490 or the like and outputs the electric signal to the automotive side communication unit 165. The mining dump truck 200 further has incorporated therein the automotive terminal system 150 in a cockpit 230.

Figure 6:
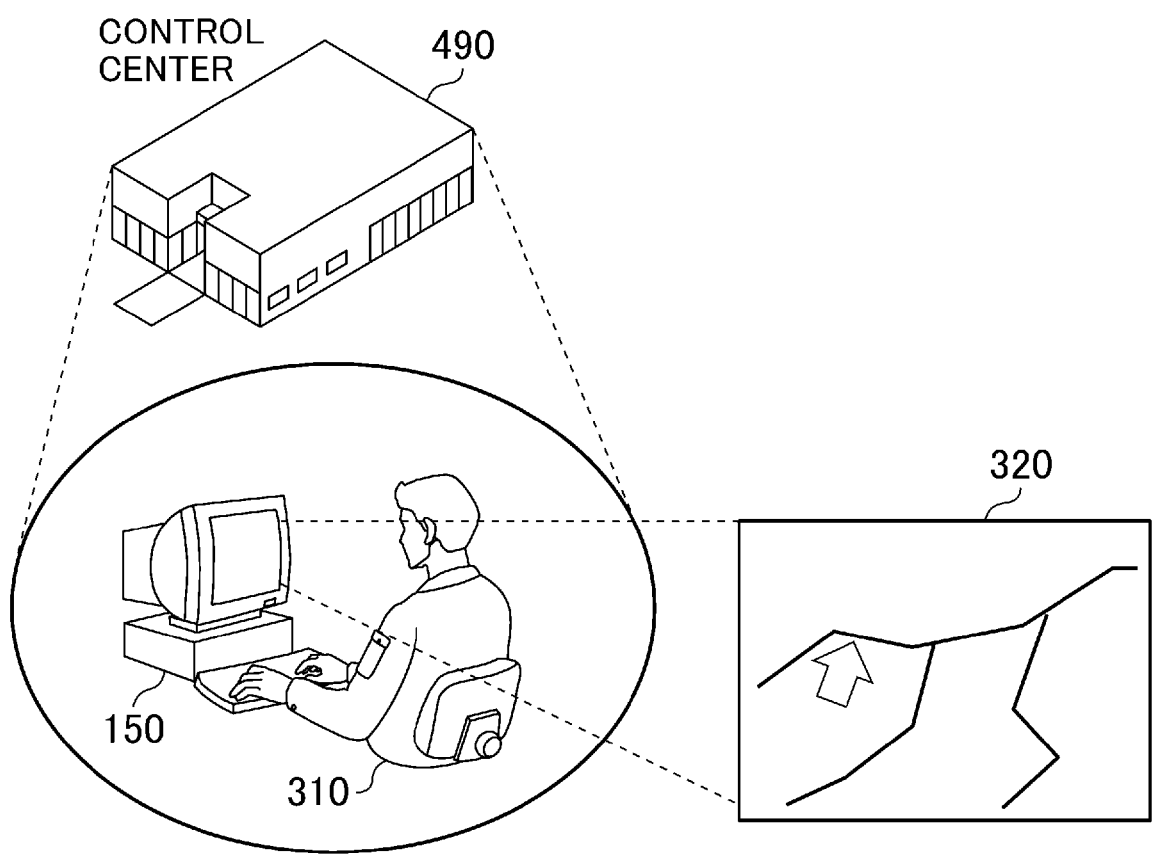
FIG. 6 is a schematic view of a configuration of a control center common to the embodiments.

Now, the control center 490 in the present embodiment is described with reference to FIG. 6. The control center 490 has the control center system 100 installed therein, and an operator 310 operates the control center system 100. Further, a screen 320 of the control center system 100 is used to perform information presentation to the operator 310. The operator 310 uses the control center system 100 to perform an editing operation of the master map or issue an updating instruction of the master map.

Now, a map updating process flow of a mining dump truck by the operation management system according to the first embodiment configured in such a manner as described above is described with reference to FIGS. 7 and 8. First, the processing flow of the control center system 100 is described with reference to FIG. 7.

Figure 7:
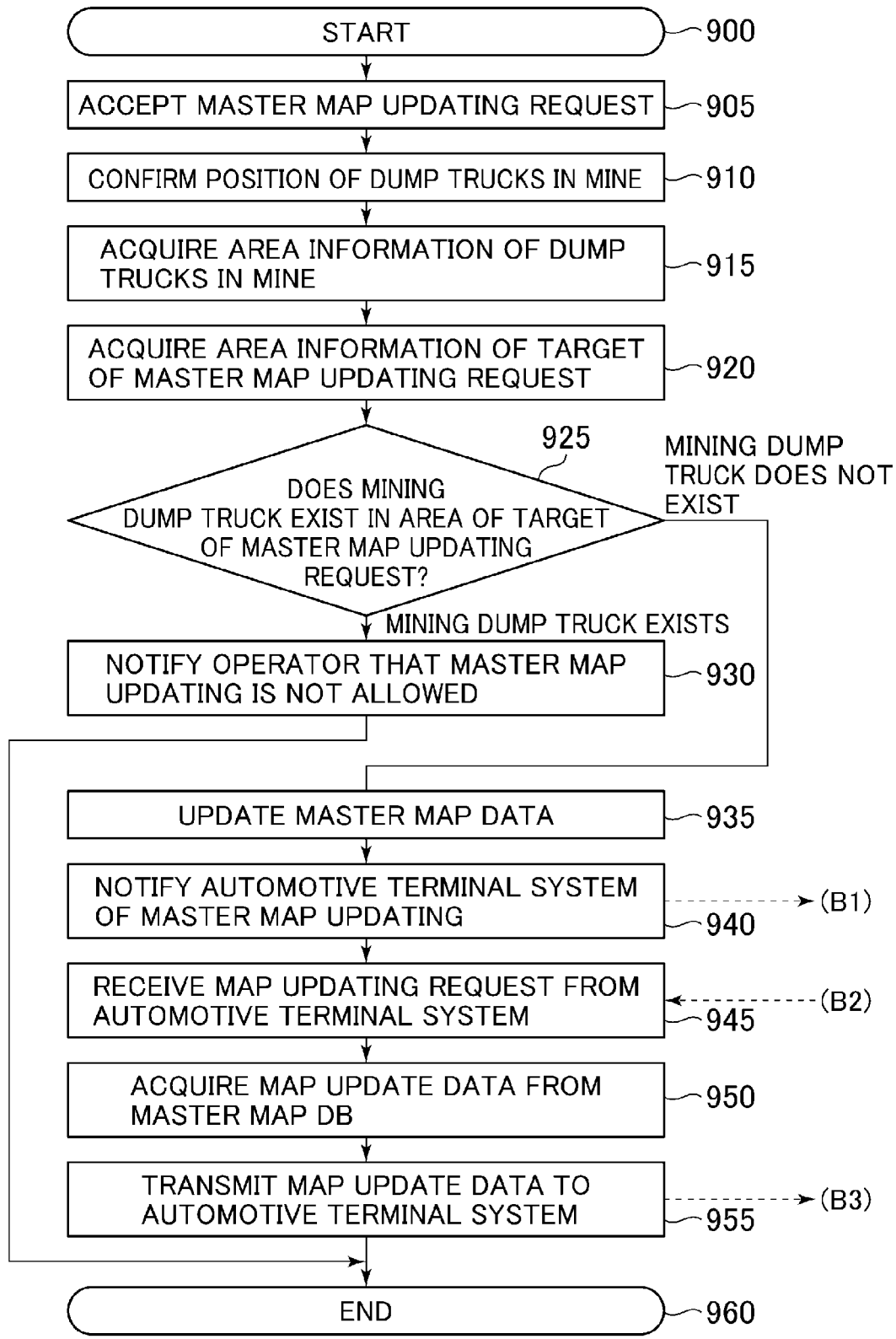
FIG. 7 is a flow chart of a map updating process flow of a control center system of the first embodiment.

First, at step 900 in FIG. 7, the control center system 100 performs an initial setting process for confirming acceptance of a process start request from a user and the startup state of the control center system 100. The process start request from the user is performed through the center side inputting unit 120, and if a process start request is accepted, then the processing advances to step 905.

At step 905, the control center system 100 accepts, from the center side inputting unit 120, a request for amendment, addition or deletion (hereinafter referred to sometimes as master map updating request) of information relating to a shape, a speed limit, a gradient, a curvature and a road surface resistance of part (a road link) of the master map managed by the master map DB 130.

Here, the master map data managed by the master map DB 130 is described with reference to FIGS. 9, 10, 11, 12, 13 and 14. The tables depicted in FIGS. 9 to 14 are stored in the master map DB 130 and indicate roads (transport routes) for a mining dump truck. In the present embodiment, a road in the master map data is defined by a combination of a plurality of small sections, and each of the small sections is referred to as road link. As a reference for delimiting a road with road links, for example, an intersection to which a different road is connected and an attribute such as a speed limit of the road (sometimes referred to as road link attribute) are available, and a road that connects two intersections to each other or a road having the same road link attribute sometimes makes one road link.

FIG. 9 depicts a road shape management table 1300 for managing the shape of road links (road shape) in the mine site. In the present embodiment, a road shape is defined by coordinates of two or more nodes that configure each road link. The road shape management table 1300 manages a road link ID 1310 allocated individually to each road link and a road shape (coordinates of nodes) 1320 of the road link having the road link ID 1310. It is to be noted that the coordinate system for representing the road shape 1320 may be the longitude-latitude system or may be a unique coordinate system set in the mine. In FIG. 9, an example in which a coordinate system that is set uniquely in the mine and represents coordinates in the longitude and latitude directions by integers is utilized is depicted.

FIG. 10 is a view depicting a mining field area management table 1400 for managing in which mining field area a road link in the mine site is included. The mining field area management table 1400 manages a road link ID 1410 of each road link, and mining field area information 1420 indicative of a mining field area to which the road link indicated by the road link ID 1410 belongs. By utilizing the mining field area management table 1400, a mining field area to which a road link belongs can be searched out using the ID of the road link.

FIG. 11 is a view depicting a speed limit management table 1500 for managing a speed limit on the road links in the mine site. The speed limit management table 1500 manages a road link ID 1510 of each road link and speed limit information 1520 of the road link indicated by the road link ID 1510.

FIG. 12 is a view depicting a gradient management table 1600 for managing the gradient of each road link in the mine site. The gradient management table 1600 manages a road link ID 1610 of each road link and gradient information 1620 of the road link indicated by the road link ID 1610.

FIG. 13 is a view depicting a curvature management table 1700 for managing the curvature of the road links in the mine site. The curvature management table 1700 manages a road link ID 1710 of each road link and curvature information 1720 of the load link indicated by the road link ID 1710.

FIG. 14 is a view depicting a road surface resistance management table 1800 for managing the road surface resistance of the road links in the mine site. The road surface resistance management table 1800 manages a road link ID 1810 of each road link and road surface resistance information 1820 of the road link indicated by the road link ID 1810. The road surface resistance information 1820 may be represented using a p value or by a degree of slipperiness as classified into a plurality of stages (such as "DRY" and "WET") in response the state of the road surface. In FIG. 14, an example in which the road surface resistance is represented using a $\mu$ value is depicted.

As described above, in the master map DB 130, at least the road shape management table 1300, mining field area management table 1400, speed limit management table 1500, gradient management table 1600, curvature management table 1700 and road surface resistance management table 1800 are managed. Thus, in the master map DB 130, at least one of the road shape, mining field area information, speed limit, gradient, curvature and road surface resistance of one or more road links is updated, or one or more road links are added or deleted in response to an updating request for the master map.

Referring back to FIG. 7, at step 910, the map updating decision unit 140 performs a confirmation process of the position of each mining dump truck in operation in the mine. In the position confirmation process, the positions of all of the mining dump trucks in operation registered in a mining dump truck position management table 1200 (refer to FIG. 15) managed by the dump truck position management unit 105 are acquired. Thereafter, the processing advances to step 915.

FIG. 15 is a view depicting the mining dump truck position management table. The mining dump truck position management table 1200 manages a mining dump truck ID 1210 allocated to each mining dump truck, a position 1220 of the mining dump truck having the ID mining dump truck ID 1210 and positioning time 1230 that is a point of time at which the position 1220 is measured. The mining dump truck ID 1210 is a number allocated uniquely to each mine number such as, for example, 320 or 350. The position 1220 may be represented using a coordinate system based on the longitude and the latitude or may be represented using a coordinate system used uniquely in the mine. In FIG. 15, an example in which a coordinate system that is set uniquely in the mine and represents coordinates in the latitude and longitude directions by integers is utilized is depicted. Further, the positioning time is a point of time at which the own vehicle position is measured based on navigation signals received from a plurality of GPS satellites by the own vehicle position measuring unit 155.

Figure 16:
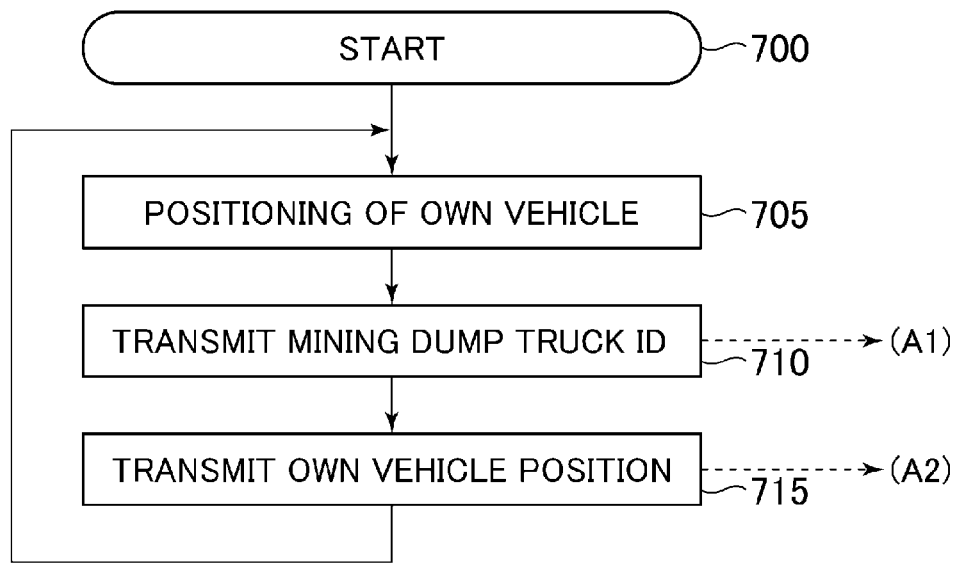
FIG. 16 is a flow chart of an own vehicle position transmission process flow of the automotive terminal system of the first embodiment.
Figure 17:
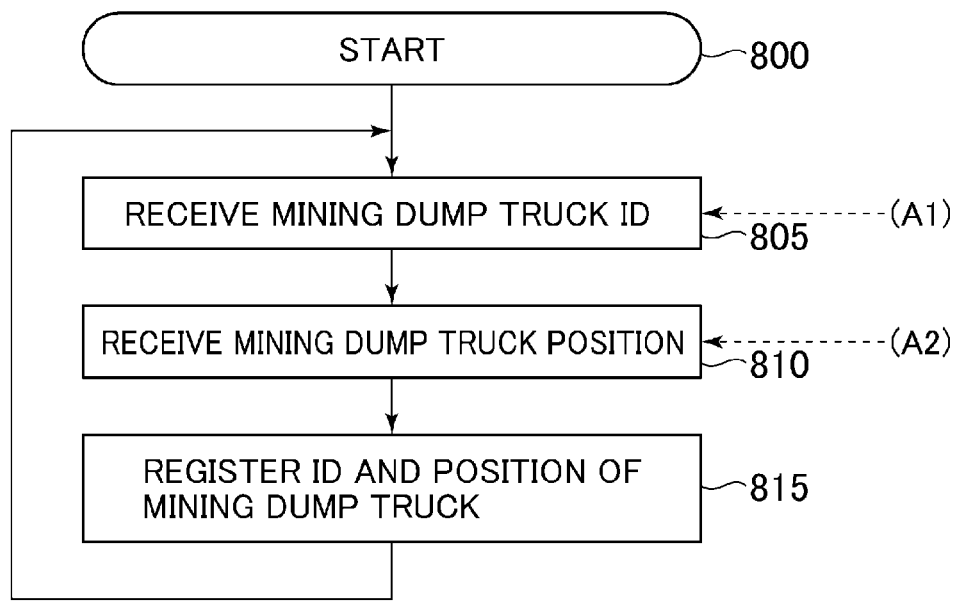
FIG. 17 is a flow chart of an own vehicle position registration process flow of the control center system of the first embodiment.

Now, a registration process of position information of each mining dump truck into the mining dump truck position management table 1200 is described. FIG. 16 depicts a transmission process flow of an own vehicle position to the control center 490 by the automotive terminal system 150, and FIG. 17 depicts a registration process flow of the current position of each mining dump truck by the control center system 100.

As depicted in FIG. 16, the automotive terminal system 150 performs, at step 700, an initial setting process for confirming acceptance of a process start request from a user and whether or not the engine of the mining dump truck is in an ON state or the like. Here, the process start request from the user is performed through the automotive side inputting unit 180, and if a process tart signal is accepted, then the processing advances to step 705.

At step 705, the automotive terminal system 150 measures, by the own vehicle position measuring unit 155 thereof, the position (own vehicle position) of the mining dump truck in which the automotive terminal system 150 itself is incorporated. Thereafter, the processing advances to step 710.

At step 710, the automotive terminal system 150 transmits, by the automotive side communication unit 165 thereof, the mining dump truck ID of the mining dump truck in which the automotive terminal system 150 itself is incorporated, to the center side communication unit 145 in the control center system 100 via the wireless communication network 190.

At step 715, the automotive terminal system 150 transmits, by the automotive side communication unit 165 thereof, the own vehicle position measured at step 705 and time (1230) at which the own vehicle position is measured to the center side communication unit 145 of the control center system 100 via the wireless communication network 190. Thereafter, the processing returns to step 705.

On the other hand, as depicted in FIG. 17, the control center system 100 performs, at step 800, an initial setting process for confirming acceptance of a process start request from a user and a startup state of the control center system. The process start request from the user is performed through the center side inputting unit 120, and if a process start request is accepted, then the processing advances to step 805.

At step 805, the control center system 100 receives, by the center side communication unit 145 thereof, the mining dump truck ID transmitted from the automotive terminal system 150.

At step 810, the control center system 100 receives, by the center side communication unit 145 thereof, from within the information transmitted from the individual automotive terminal systems 150, own vehicle position information of the mining dump trucks having the mining dump trucks ID received at step 805 and the time points at which the own vehicle positions are measured.

At step 815, the dump truck position management unit 105 registers the own vehicle position information and the position measurement time received at step 810 into the mining dump truck position management table 1200 in an associated relationship with the mining dump truck IDs.

Referring back to FIG. 7, at step 915, the control center system 100 performs an acquisition process of information (area information) indicative of in which mining field area each mining dump truck is positioned on the basis of the positions of the mining dump trucks in the mine site received at step 910. Thereafter, the processing advances to step 920. Here, the acquisition process of area information of each mining dump truck at step 915 is described.

Figure 18:
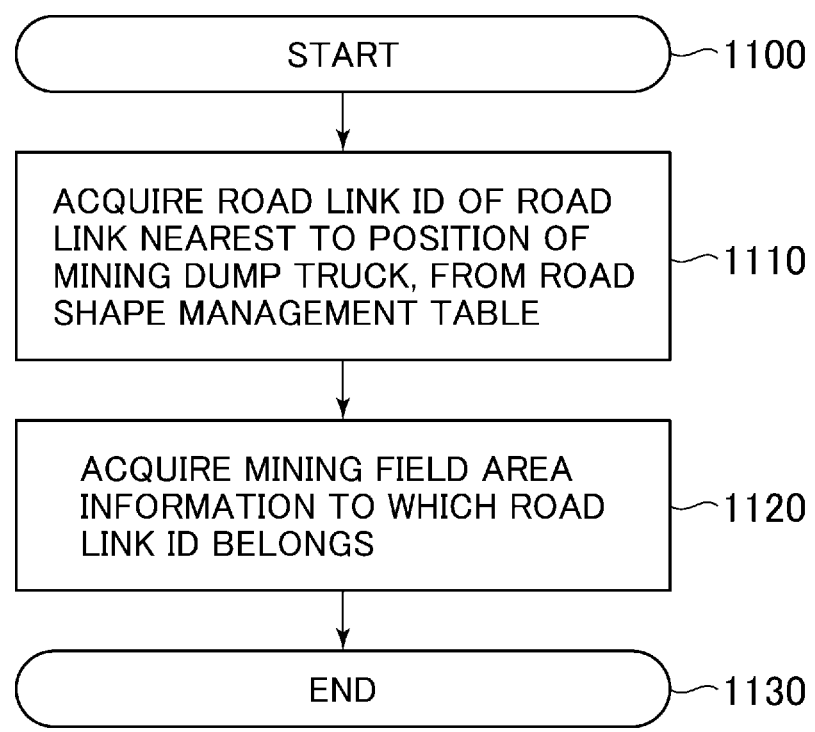
FIG. 18 is a flow chart of an own vehicle position area acquisition process flow of the control center system of the first embodiment.

FIG. 18 depicts a process flow relating to an acquisition process of area information of each mining dump truck. First at step 1100, an initial setting process for confirming acceptance of a process start request from a user and whether or not the engine of the mining dump truck is in an ON state is performed. The process start request from the user is performed through the terminal side inputting unit 180, and if a process start request is accepted, then the processing advances to step 1110.

At step 1110, the control center system 100 acquires the road link ID of a road link located nearest to the position of each mining dump truck acquired by the map updating decision unit 140 at step 910 from the road shape management table 1300. Here, the position of each mining dump truck acquired at step 910 and the coordinates of the road shape 1320 in the road shape management table 1300 are compared with each other to acquire the road link ID of the road link nearest to each mining dump truck.

At step 1120, the map updating decision unit 140 acquires the mining field area to which each road link ID determined at step 1110 belongs based on the mine field area management table 1400. Here, the map updating decision unit 140 searches out each road link ID acquired at step 1110 from the road link IDs 1410 registered in the mining field area management table 1400, and then acquires the mining field area information 1420 corresponding to the searched out road link IDs.

At step 1130, an ending process relating to the acquisition process of area information of the own vehicle positions is performed. Thereafter, the processing advances to step 920.

Referring back to FIG. 7, at step 920, the control center system 100 acquires, by the map updating decision unit 140 thereof, a mining field area (area information) to which each road link for which a master map updating request is accepted at step 905 belongs. Here, in order to acquire mining field area information of the road links relating to the mater map updating request, the road link ID of the road link for which the master map updating request is accepted at step 905 is searched out from within the mining field area management table 1400, and the mining field area information 1420 relating to the road link ID is acquired as the area information. After the acquisition of the area information is ended, the processing advances to step 925.

At step 925, using the map updating decision unit 140 the control center system 100 compares the area information of the mining dump trucks acquired at step 915 and the area information which has been acquired at step 920 and for which the master map updating request has been accepted with each other to decide whether or not a mining dump truck in operation exists in the mine areas for which the master map updating request has been accepted. If a mining dump truck exists in the mining field area for which the master map updating request has been accepted, then updating in accordance with the master map updating request is inhibited, and the processing advances to step 930. On the other hand, if a mining dump truck does not exist in the mining field areas for which the master map updating request has been accepted, then updating in accordance with the master map updating request is permitted and the processing advances to step 935.

At step 930, the control center system 100 performs, by the center side display unit 125 thereof, notification that updating of the master map is impossible because a mining dump truck in operation exists in the mining field areas for which the master map updating request has been accepted.

Figure 19:
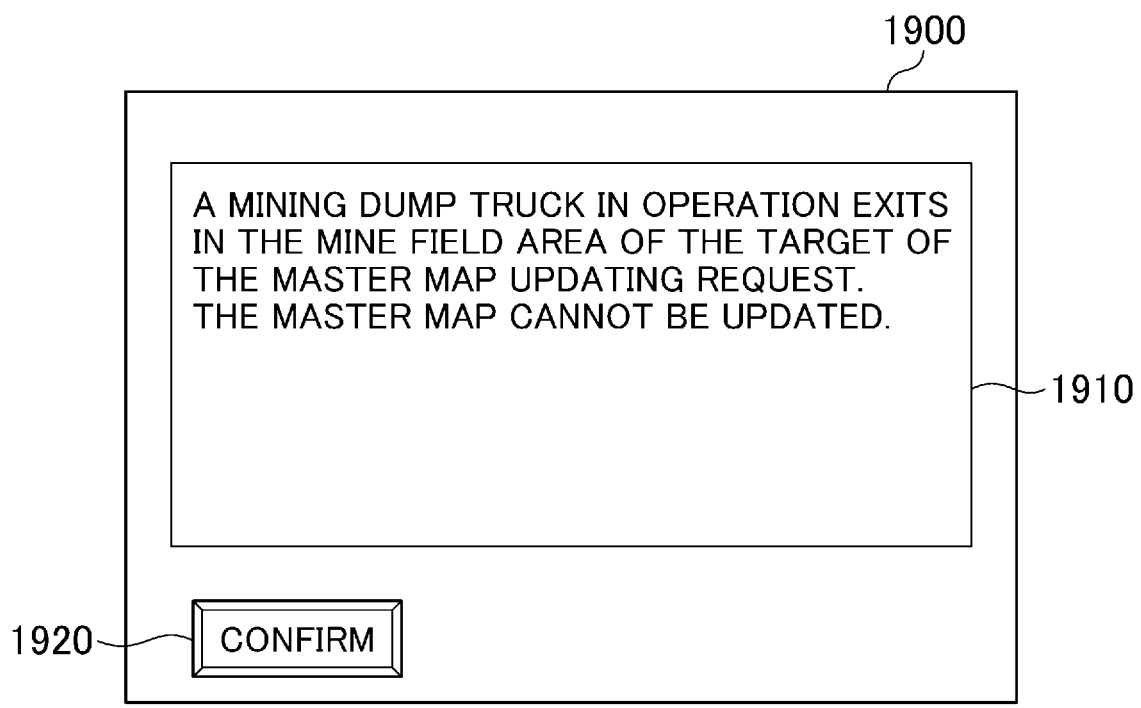
FIG. 19 is a master map updating inhibition notification screen image of the first embodiment.

FIG. 19 depicts a notification screen image 1900 displayed on the center side display unit 125 at step 930. The notification screen image 1900 is a screen image for notifying that updating of the master map is impossible and includes a dialog box 1910 in which a message "A mining dump truck in operation exits in the mining field area of the target of the master map updating request. The master map cannot be updated." is displayed and a confirmation button 1920 for inputting that confirmation of the message by an operator is completed. In this manner, the control center system 100 notifies the operator that, since a mining dump truck in operation exists in the mining field area for which updating of the master map is desired, the master map cannot be updated, through the notification screen image 1900 for notifying that updating of the master map is impossible.

On the other hand, at step 935, the control center system 100 updates, by the master map updating unit 135 thereof, the master map data of the master map DB 130 so as to reflect the master map updating request accepted at step 905. Thereafter, the processing advances to step 940.

At step 940, a master map updating notification is transmitted from the center side communication unit 145 to the automotive side communication unit 165 of the automotive terminal system 150, and thereafter, the processing advances to step 945.

At step 945, the center side communication unit 145 receives a map updating request transmitted from the automotive side communication unit 165 of the automotive terminal system 150, and then the processing advances to step 950.

At step 950, the master map updating unit 135 acquires, from the master map DB 130, automotive updating data for updating the automotive map data of the automotive map DB 170 of the automotive terminal system 150 into the master map data updated at step 935. Thereafter, the processing advances to step 955.

At step 955, the map updating data acquired at step 950 are transmitted from the center side communication unit 145 to the automotive side communication unit 165 of the automotive terminal system 150. Thereafter, the processing advances to step 960.

At step 960, the control center system 100 performs an ending process of the master map updating. In the ending process, information indicating an end of the master map process (for example, a message or a figure) is displayed on the center side display unit 125.

Figure 8:
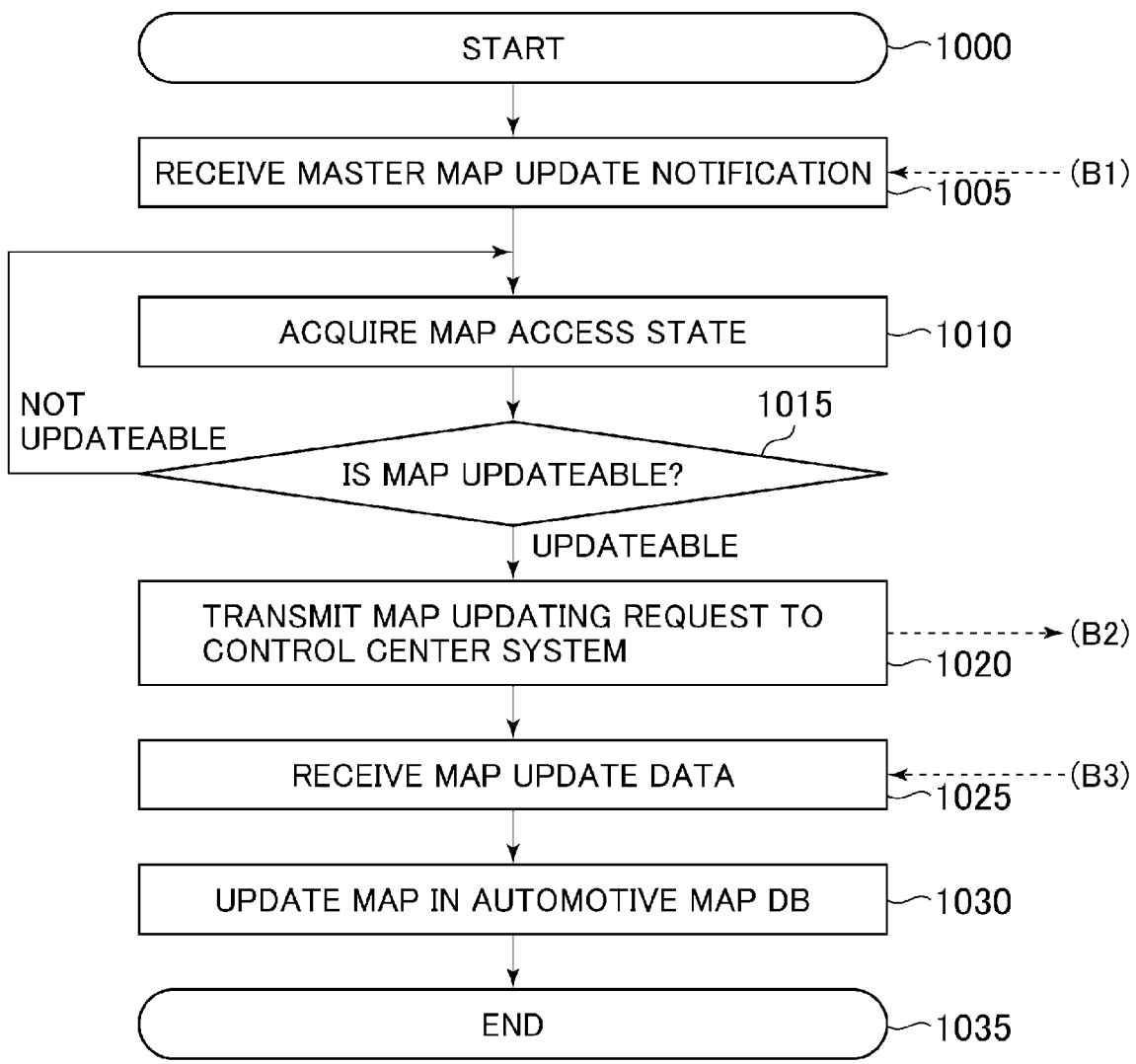
FIG. 8 is a flow chart of a map updating process flow of an automotive terminal system of the first embodiment.

Subsequently, a process flow of the automotive terminal system 150 is described with reference to FIG. 8. First, at step 1000, the automotive terminal system 150 performs an initial setting process for confirming acceptance of a process start request from a user and whether or not the engine of the mining dump truck is in an ON state. The process start request from the user is performed through the automotive side inputting unit 180, and if a process start request is accepted, then the processing advances to step 1005.

At step 1005, the automotive terminal system 150 receives, by the automotive side communication unit 165 thereof, a master map updating notification transmitted from the center side communication unit 145 at step 940. Thereafter, the processing advances to step 1010.

At step 1010, the automotive side controlling unit 160 acquires, in order to decide whether or not it is possible to update the map data of the automotive terminal system 150, an access state (map access state) to the automotive map data of the automotive map DB 170 from a different part. Thereafter, the processing advances to step 1015.

At step 1015, if it is decided on the basis of the map access state acquired at step 1010 that there is no access to the map data (namely, if it is decided that it is possible to update the map), then the processing advances to step 1020. On the other hand, if it is decided that there is a map data access (namely, if it is decided that it is impossible to update the map), then the processing returns to step 1010. Here, the state in which it is possible to update the map (the state in which there is no map data access) indicates a state in which there is no access to the map data from the outside for more than a fixed period of time such as a state in which the mining dump truck remains stopping after it arrives at a destination or a state in which the mining dump truck stops and is waiting for a next work instruction.

At step 1020, the automotive side communication unit 165 transmits a map updating notification to the center side communication unit 145. Then at step 1025, the automotive side communication unit 165 receives map updating data from the center side communication unit 145, and thereafter, the processing advances to step 1030.

At step 1030, the automotive map data of the automotive map DB 170 are updated using the map updating data received at step 1025 by the automotive map updating unit 175, and thereafter, the processing advances to step 1035. At step 1035, the automotive terminal system 150 performs an ending process of the automotive map updating.

In the first embodiment configured in such a manner as described above, in order to decide whether or not an updating request for map data regarding a road in a mine is to be permitted, the inside of the mine is partitioned into one or more "mining fields" that are closed regions, and when no mining dump truck exists in a mining field in which a road link relating to the map updating request is included, the updating of the map data in accordance with the map updating request is permitted. By this, the master map data and automotive map data can be updated without stopping operation of all of the mining dump trucks under the control of the control center, and therefore, the working efficiency by the mining dump trucks can be improved.

It is to be noted that, while, in the foregoing description of the embodiment, a case in which all road links are included in some mining fields is described, where a road link relating to a master map updating request is not included in any of the mining fields, such a configuration may be adopted that updating of the master map data and the automotive map data based on the updating request is always permitted.

Second Embodiment

Now, a second embodiment of the present invention is described. In the present embodiment, management of map data is performed in a unit of a mining field area similarly as in the first embodiment. However, if a mining dump truck exists in a mining field area that includes an updating location of the map data, then a stopping instruction is outputted to the mining dump truck to stop only the mining dump truck, and then the master map data and the automotive map data are updated. Then, after the updating of the map data is completed, a departure order is outputted to the stopped mining dump truck to re-start the mining dump truck.

This is described in connection with a particular example. In the second embodiment, if it is tried to change the road link 510 in the mine field C area 460 as depicted in FIG. 2, then the control center system decides whether or not a mining dump truck exits in the mine field C area 460. In the example of FIG. 2, since the three mining dump trucks 380, 382 and 384 exist in the mining field C area in which the road link 510 is included, the master map data of the control center system are updated after the three mining dump trucks 380, 382 and 384 are stopped, and after the updating ends, the control center system outputs a departure order to the mining dump trucks 380, 382 and 384. Consequently, map updating can be performed only by stopping operation of part of the mining dump trucks upon map updating.

Figure 20:
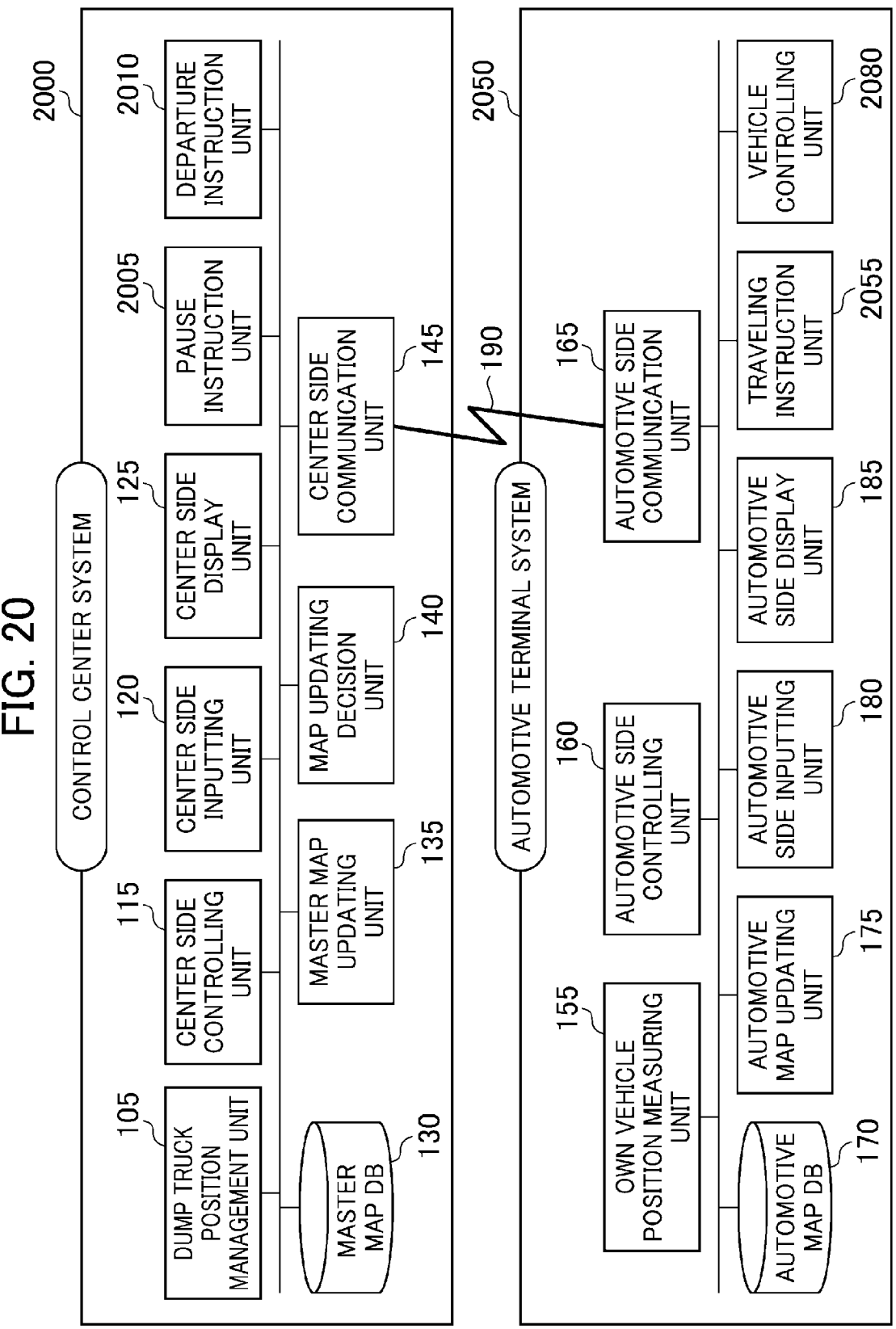
FIG. 20 is a system configuration diagram of a second embodiment.

Here, a system configuration diagram of the second embodiment is depicted in FIG. 20. In the control center system 2000 depicted in FIG. 20, the control center system 100 of the first embodiment additionally includes a pause instruction unit 2005 for outputting a pause instruction to a mining dump truck, and a departure instruction unit 2010 for outputting a new departure instruction to the mining dump truck after it confirms that the map updating of an automotive terminal system 2050 is completed.

Further, in the automotive terminal system 2050, the automotive terminal system 150 of the first embodiment additionally includes a traveling instruction unit 2055 for receiving a pause order or a departure instruction from the control center system 2000 and issuing a pause instruction or a departure instruction to the vehicle controlling unit 2080.

Figure 21:
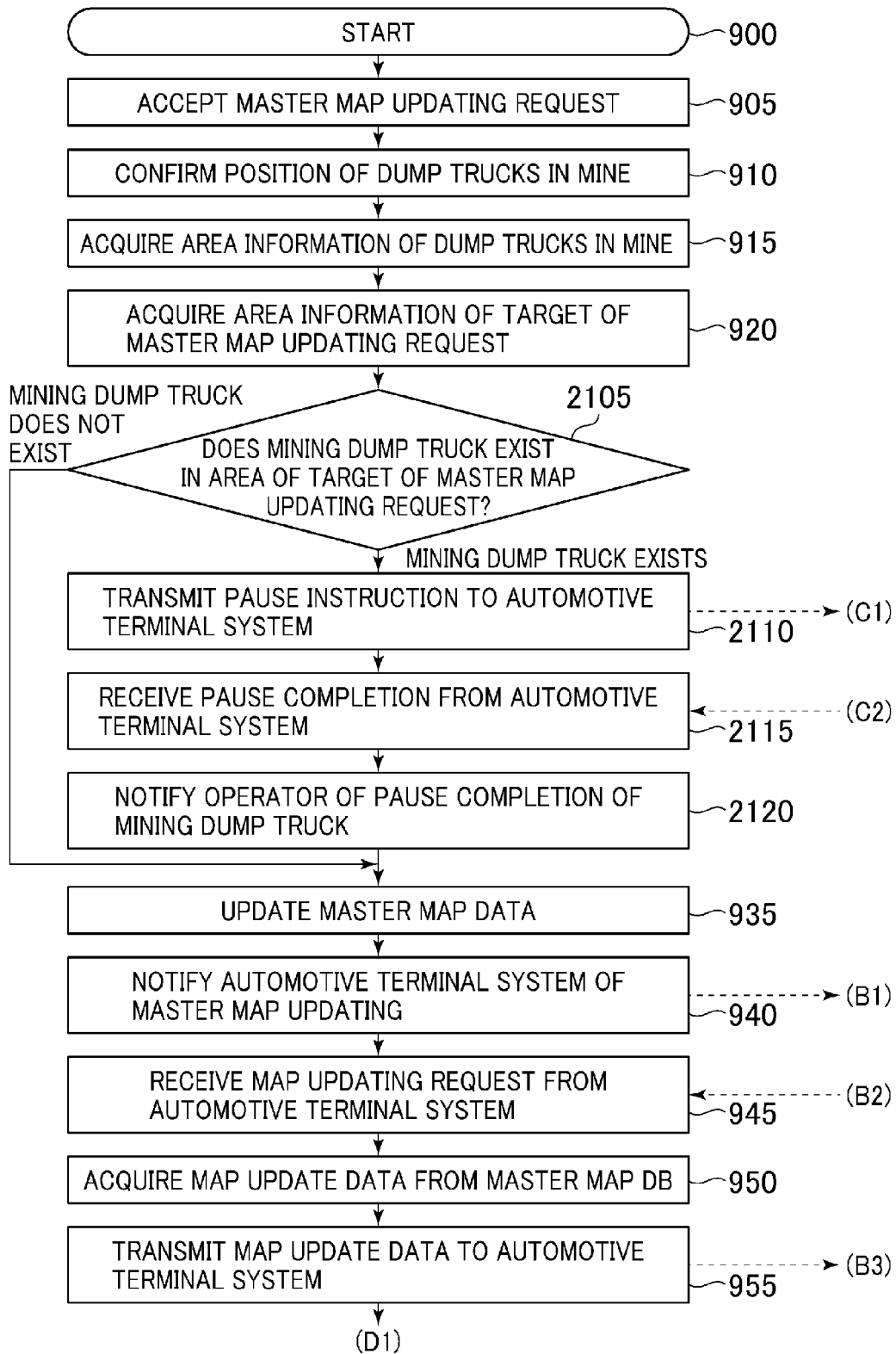
FIG. 21 is a flow chart of a map updating process flow of a control center system of the second embodiment.
Figure 22:
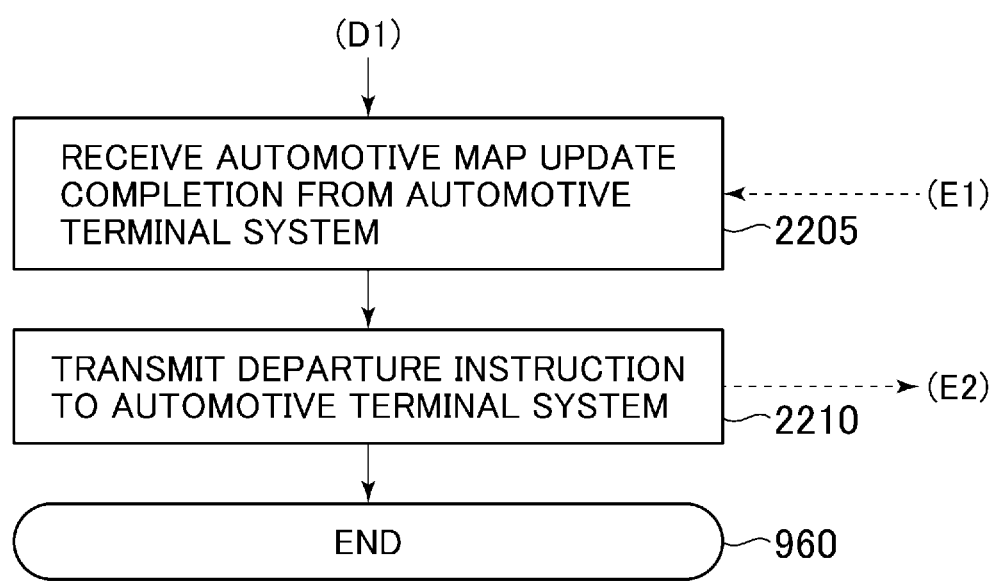
FIG. 22 is a flow chart of a map updating process flow of the control center system of the second embodiment.

Now, a map updating process flow of a mining dump truck by the operation management system according to the second embodiment is described. First, a map updating processing flow of the control center system 2000 depicted in FIGS. 21 and 22 is described.

In the map updating process flow of the control center system 2000 in the present embodiment, the steps from step 900 to step 920 are same as those of the map updating process flow of the control center system 100 in the first embodiment.

Then at step 2105, in the control center system 2000, the map updating decision unit 140 compares area information of each mining dump truck acquired at step 920 and area information of an area for which a master map updating request is accepted at step 920 with each other to decide whether or not a mining dump truck in operation exists in the mining field area for which the master map updating request has been acquired. If a mining dump truck in operation exists in the mining field area for which the master map updating request has been acquired, then the processing advances to step 2110. On the other hand, if no mining dump truck in operation exists in the mining field area for which the master map updating request has been acquired, then the control center system 2000 permits the master map updating request, and the processing advances to step 935.

At step 2110, in the control center system 2000, the pause instruction unit 2005 transmits a mining dump truck pause instruction to the automotive side communication unit 165 of the mining dump truck existing in the mining field area for which the master map updating request has been acquired through the center side communication unit 145. Thereafter, the processing advances to step 2115.

At step 2115, in the control center system 2000, the center side communication unit 145 receives a mining dump truck pause completion notification transmitted from the automotive side communication unit 165 of the mining dump truck existing in the mining field area for which the master map updating request has been acquired. Thereafter, the processing advances to step 2120.

At step 2120, the control center system 2000 notifies the operator through the center side display unit 125 that pause of all mining dump trucks that have been traveling in the mining field area for which the master map updating request has been acquired. Thereafter, the processing advances to step 935.

Figure 23:
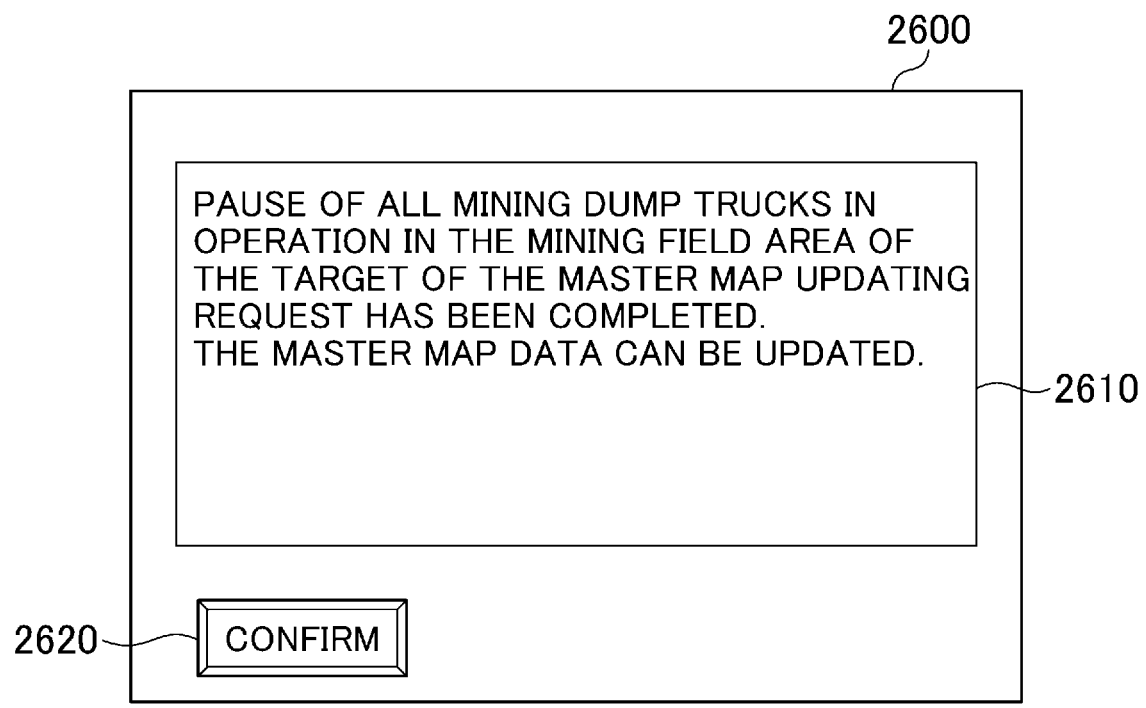
FIG. 23 is a view of a mining dump truck pause completion notification screen image of the second embodiment.

FIG. 23 depicts an example of a notification screen image 2600 displayed on the center side display unit 125 at step 2120. The notification screen image 2600 depicted in FIG. 23 is a screen image for notifying that pause of the mining dump trucks is completed, and includes a dialog box 2610 in which a message "Pause of all mining dump trucks in operation in the mining field area of the target of the master map updating request has been completed. The master map data can be updated." is displayed, and a confirmation button 2620 for inputting that confirmation of the message by an operator is completed. By the notification screen image 2600, the operator is notified that pause of all of the mining dump trucks in the mining field area with regard to which the master map data are to be updated is completed.

The steps from the following step 935 to step 955 are same as those of the map updating process flow of the control center system 100 in the first embodiment, and therefore, description of them is omitted herein.

After step 955 comes to an end, the control center system 2000 receives, at step 2205 (refer to FIG. 22), an automotive map updating completion notification transmitted from the automotive side communication unit 165 of each mining dump truck existing in the mining field area relating to the master map updating request through the center side communication unit 145. Thereafter, the processing advances to step to step 2210.

At step 2210, the departure instruction unit 2010 decides whether or not the updating of the automotive map DB 170 of all of the mining dump trucks existing in the mining field area relating to the master map updating request is completed. Then at a stage at which the updating of the automotive map data of all of the mining dump trucks is completed, the departure instruction unit 2010 transmits a departure instruction for re-starting traveling to the automotive side communication unit 165 of the mining dump trucks via the center side communication unit 145. Finally at step 960, an ending process is performed similarly as in the map updating process flow of the control center system of the first embodiment.

Figure 24:
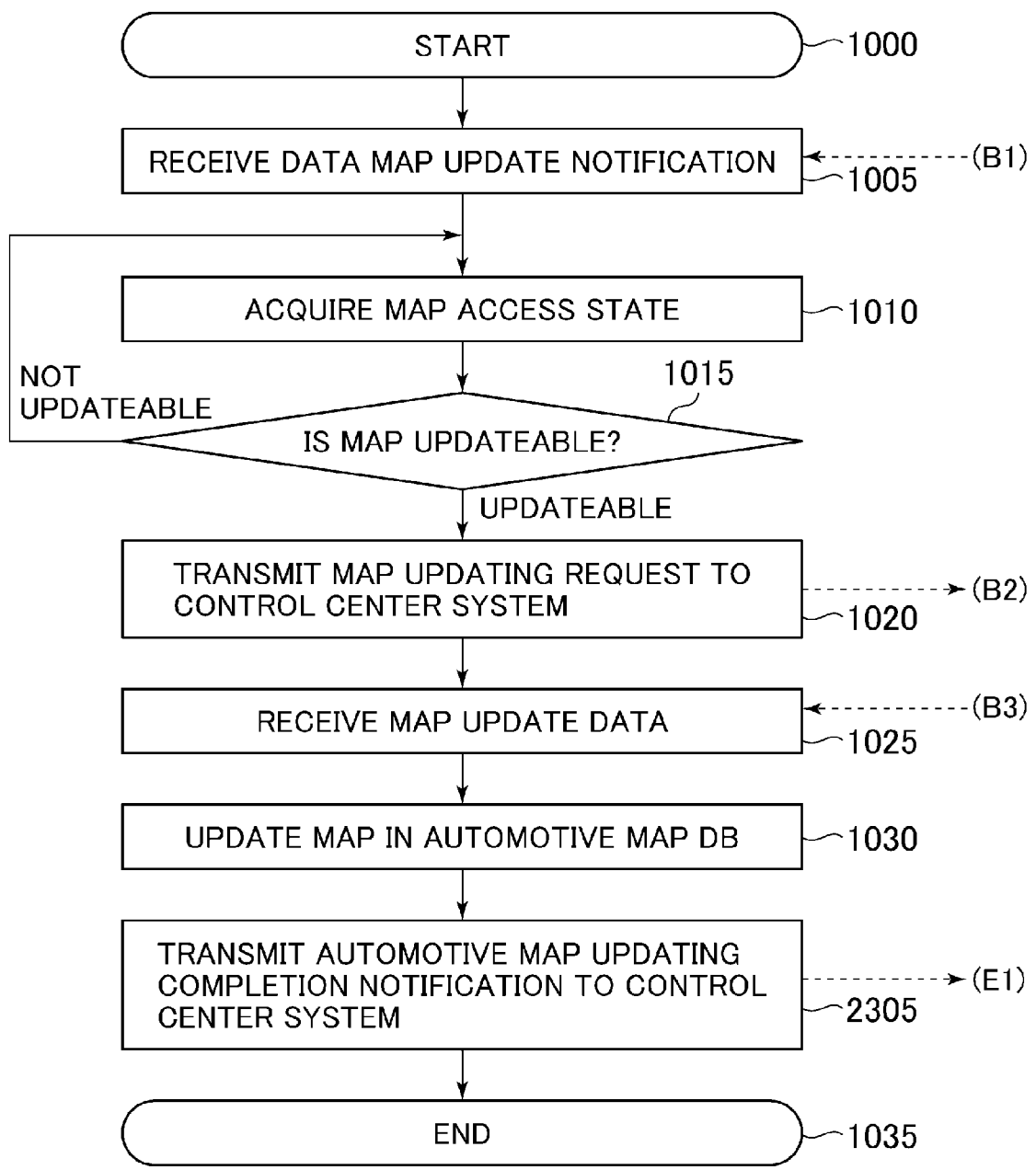
FIG. 24 is a flow chart of a map updating process flow of an automotive terminal system of the second embodiment.

Now, a map updating process flow of the automotive terminal system according to the second embodiment of the present invention depicted in FIG. 24 is described. In the map updating process flow of the automotive terminal system 2050 depicted in this figure is same at the steps from step 1000 to step 1030 thereof as the map updating process flow of the automotive terminal system 150 in the first embodiment. Therefore, description of the steps is omitted.

After the step 1030 comes to an end, the automotive side communication unit 165 of each automotive terminal system 2050 transmits, at step 2305, an automotive map updating completion notification for the notification that updating of the automotive map data is completed to the center side communication unit 145 of the control center system 2000. Then, finally at step 1035, an ending process similar to that in the map updating process flow of the automotive terminal system in the first embodiment is performed.

Figure 25:
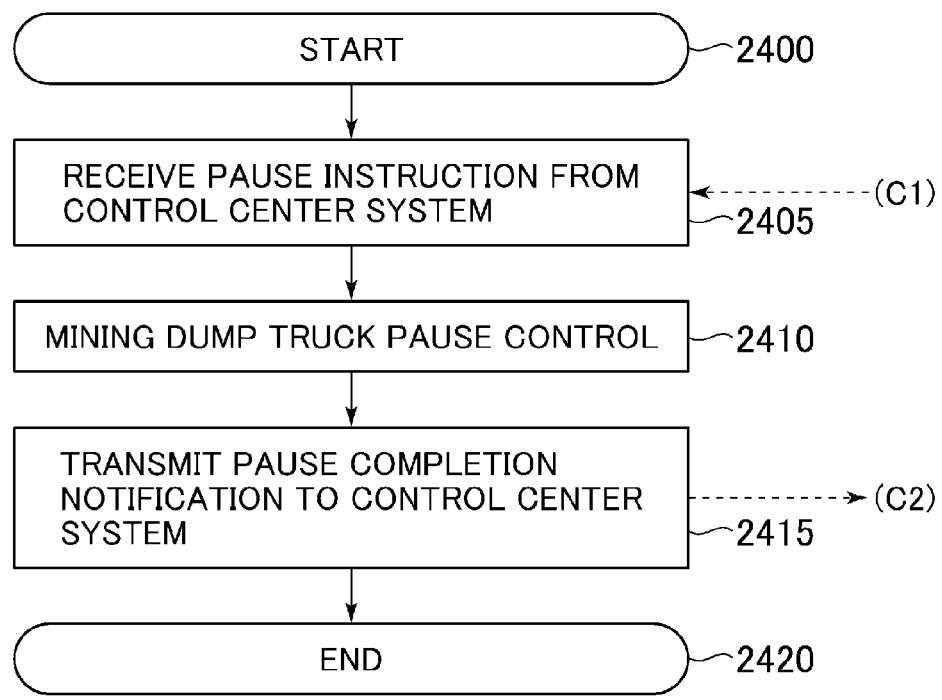
FIG. 25 is a flow chart of a pause process flow of a mining dump truck of the second embodiment.

Now, a pause process flow of a mining dump truck by the automotive terminal system 2050 that receives a pause instruction from the control center system 2000 is described with reference to FIG. 25. First at step 2400, the automotive terminal system 2050 performs an initial setting process for confirming acceptance of a process start request from a user and whether or not the engine of the mining dump truck is in an ON state or the like. The process start request from the user is performed through the automotive side inputting unit 180, and if a process tart signal is accepted, then the processing advances to step 2405.

At step 2405, the automotive terminal system 2050 receives, by the automotive side communication unit 165 thereof, the mining dump truck pause instruction outputted from the center side communication unit 145 at step 2110 (refer to FIG. 21). Then at step 2410, the traveling instruction unit 2055 outputs a pause instruction to the vehicle controlling unit 2080 to stop the mining dump truck 200.

At step 2415, the automotive terminal system 2050 transmit a mining dump truck pause completion notification from the automotive side communication unit 165 to the center side communication unit 145. At step 2420, an ending process of the mining dump truck pause by the automotive terminal system 2050 is performed.

Figure 26:
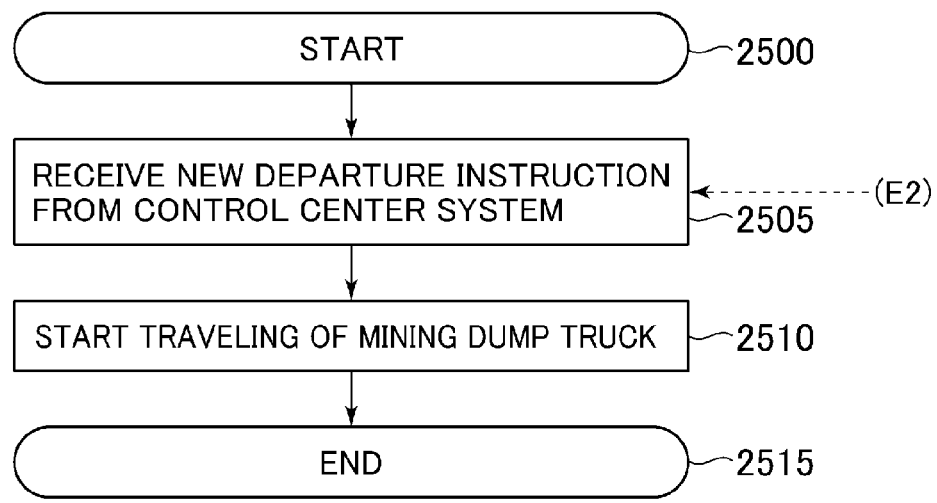
FIG. 26 is a flow chart of a traveling starting process flow after map updating of the mining dump truck of the second embodiment.

Now, a departure process flow of the mining dump truck of the automotive terminal system 2050 that receives the departure instruction from the control center system 2000 is described with reference to FIG. 26. First at step 2500, the automotive terminal system 2050 performs an initial setting process for confirming acceptance of a process start request from a user and whether or not the engine of the mining dump truck is in an ON state or the like. The process start request from the user is performed through the automotive side inputting unit 180, and if a process tart signal is accepted, then the processing advances to step 2505.

At step 2505, the automotive terminal system 2050 receives, by the automotive side communication unit 165 thereof, the departure instruction of the mining dump truck outputted from the center side communication unit 145 at step 2210 (refer to FIG. 22). Then at step 2510, a departure instruction for instructing the vehicle controlling unit 2080 to start traveling is outputted from the traveling instruction unit 2055 to cause the mining dump truck 200 to re-start traveling. Then at step 2515, the automotive terminal system 2050 performs an ending process relating to the starting of traveling of the mining dump truck after the map updating.

In the second embodiment configured in such a manner as described above, when a mining dump truck or trucks exist in a mining field that includes a road link relating to a map updating request, all mining dump trucks existing in the mining field are stopped, whereafter the master map data and the automotive map data are updated. Further, after updating of the master map data and the automotive map data is completed, a departure instruction is outputted to the mining dump trucks in the stopping state to re-start the transport work automatically. By this, even when a mining dump truck or trucks exist in a mining field relating to a map updating request, the master map data and the automotive map data can be updated only by stopping only the mining dump trucks in the mining field. Therefore, such a situation that all mining dump trucks existing in the mine area are stopped to degrade the work efficient significantly can be prevented. Further, since the second embodiment is configured such that the work is re-started automatically after completion of the updating of the map data, the time for which the work stops can be suppressed to a requisite minimum level.

Third Embodiment

Now, a third embodiment of the present invention is described. In the present embodiment, management of map data is performed in a unit of a travel route of a mining dump truck (route from a point of departure to a destination set to each mining dump truck), and map data are updated when an updating location of the map data is included in any travel route of any mining dump truck.

It is to be noted that the travel routes of the mining dump trucks are managed by a vehicle allocation management unit 2805 (hereinafter described) of a control center system 2800. Usually, a road that connects a loading field and an unloading field in a mining field to which each mining dump truck belongs is set as a travel route, and each mining dump truck repetitively travels between the loading field and the unloading field set at the opposite ends of the own travel route. It is to be noted that, at a point of time at which each mining dump truck reaches the loading field or the unloading field and completes its work, a next destination may naturally be set newly thereby to change the travel route every time.

Figure 27:
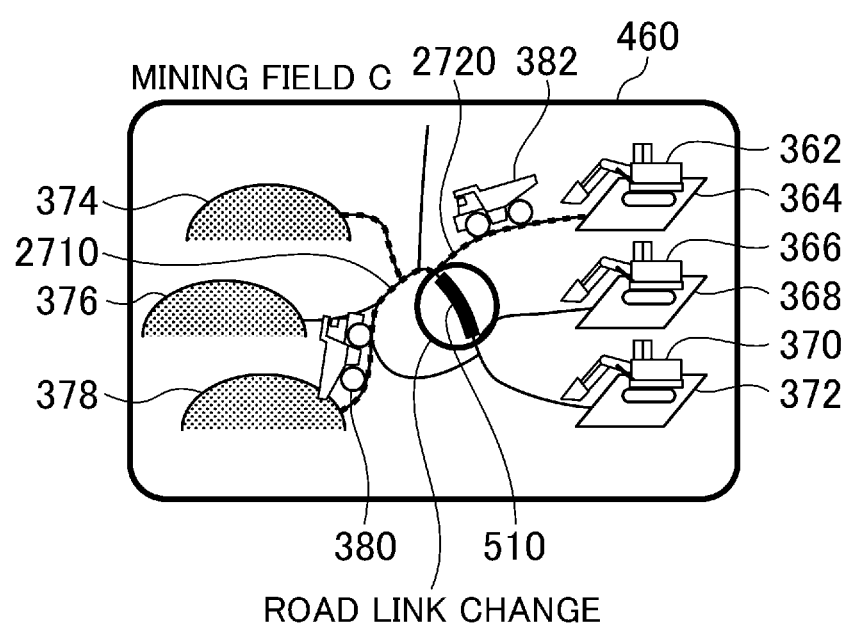
FIG. 27 is an explanatory view relating to map updating in the second embodiment.

A particular example of a case in which map updating is performed in the third embodiment is described with reference to FIG. 27. In FIG. 27, a mining dump truck 380 uses a road that connects from an unloading field 378 to a loading field 364 as a travel route 2710, and a mining dump truck 382 uses a road that connects from the loading field 364 to an unloading field 374 as a travel route 2720. In this case, when it is tried to change the map data relating to the road link 510, the road link 510 is not included in any of the travel routes 2710 and 2720 of all mining dump trucks 380 and 382 that travel in the mining field C area. Accordingly, the map data relating to the road link 510 can be updated without stopping any of the mining dump trucks 380 and 382.

Figure 28:
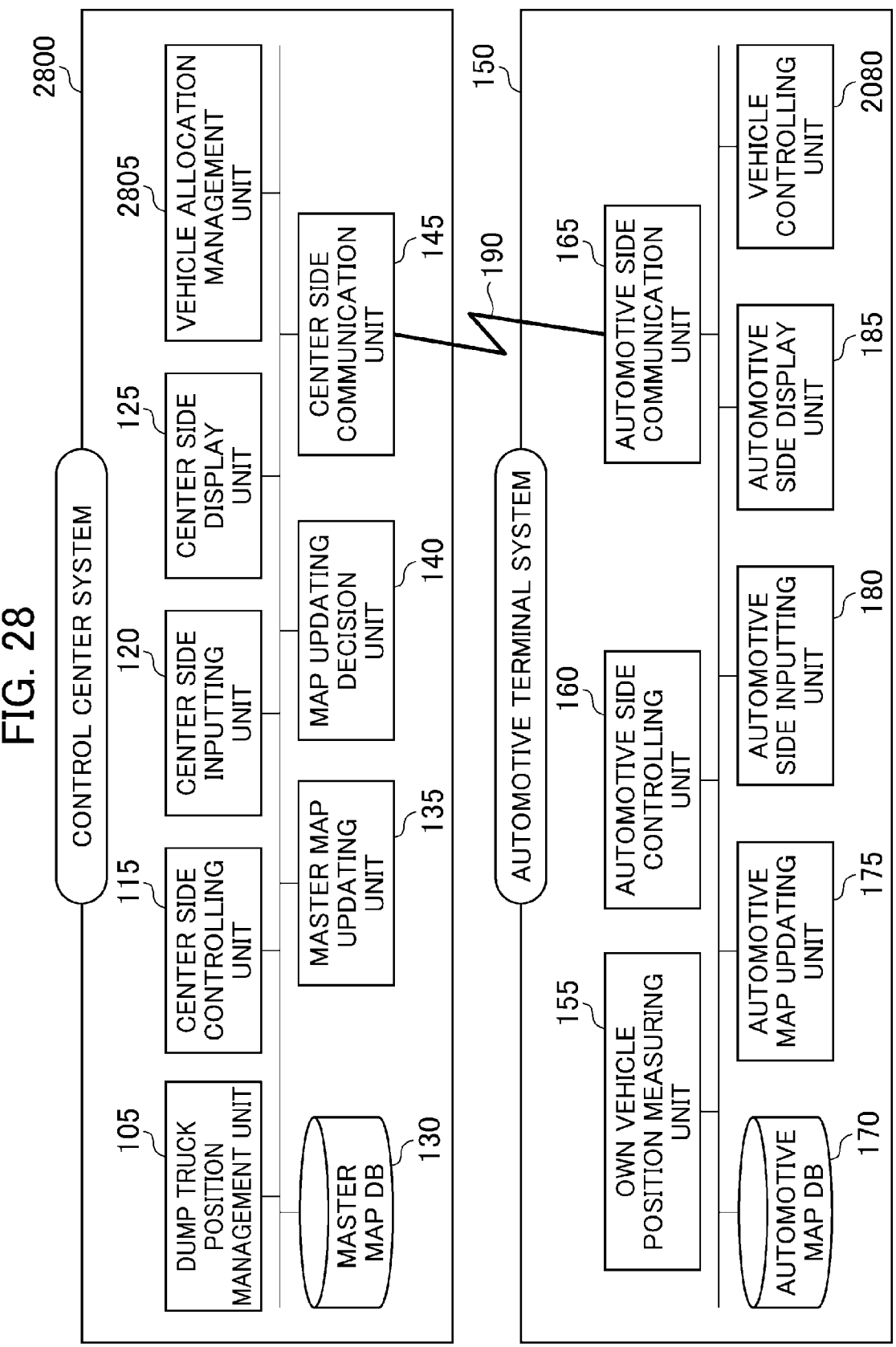
FIG. 28 is a system configuration diagram of a third embodiment.

A system configuration diagram of the third embodiment is depicted in FIG. 28. In a control center system 2800 depicted in FIG. 28, the control center system 100 of the first embodiment additionally includes a vehicle allocation management unit 2805 for managing the travel routes of the mining dump trucks. The vehicle allocation management unit 2805 performs allocation planning of the mining dump trucks for efficiently transporting minerals and dirt in the mine so that a new destination and a new travel route can be set every time a series of transporting works of each mining dump truck such as to move from a loading field to an unloading field and carry out unloading at the unloading field or to move from an unloading field to a loading field and perform loading at the loading field comes to an end. It is to be noted that the configuration of the automotive terminal system in the third embodiment is same as that of the automotive terminal system of the first embodiment, and therefore, description of the configuration is omitted herein.

Figure 29:
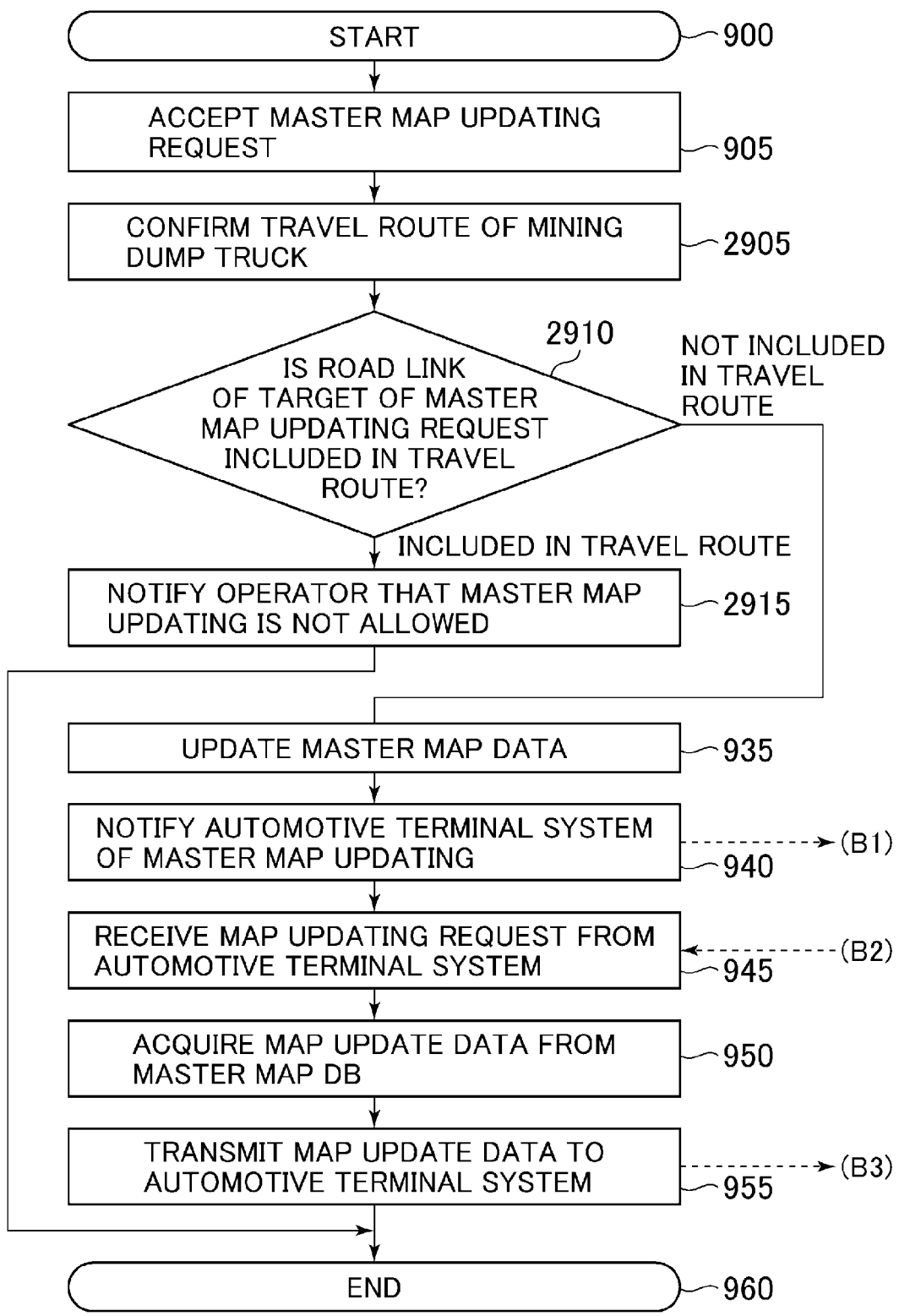
FIG. 29 is a flow chart of a map updating process flow of a control center system of the third embodiment.

Now, a map updating process flow of a mining dump truck by the operation management system according to the third embodiment is described. First, a map updating process flow of the control center system 2800 depicted in FIG. 29 is described.

The map updating process flow of the control center system 2800 in the present embodiment is same at the steps from step 900 to step 905 thereof as the map updating process flow of the control center system in the first embodiment, and therefore, description of it is omitted herein.

After step 905 comes to an end, the vehicle allocation management unit 2805 of the control center system 2800 acquires, at step 2905, a set of road links relating to travel routes of the mining dump trucks currently in operation from a travel route management table 3000 (refer to FIG. 30) managed by the vehicle allocation management unit 2805.

Here, the travel route management table managed by the vehicle allocation management unit 2805 is described with reference to FIG. 30. As depicted in FIG. 30, the travel route management table 3000 manages the travel routes of all mining dump trucks in the mine and is configured from a travel route ID 3010 allocated uniquely to each travel route, a road link set 3020 of travel routes having travel route IDs and represented by a set of road links, a point 3030 of departure of the travel route of each travel route ID, a destination 3040 of the travel route of each travel route ID, and a mining dump truck ID 3050 of each traveling dump truck that is traveling the travel route of each travel route ID.

At step 2905 described hereinabove, the vehicle allocation management unit 2805 acquires mining dump truck IDs of the mining dump trucks that are currently traveling, and acquires road link sets 3020 relating to the mining dump truck IDs from the travel route management table 3000. Consequently, all road links relating to the travel routes of the mining dump trucks that are currently traveling can be acquired.

The at step 2910, in the control center system 2800, the vehicle allocation management unit 2805 decides whether or not a road link or links for which a master map updating request is accepted at step 905 are included in the road link sets (travel routes) acquired at step 2905. Here, if any of the road links for which the master map updating request is accepted is included in the travel route of some mining dump trucks, then the control center system 2800 inhibits updating based on the master map updating request and the processing advances to step 2915. However, if the road link for which the master map updating request is accepted is not included in the travel route of any mining dump trucks, the control center system 2800 permits updating based on the master map updating request. Thereafter, the processing advances to step 935.

At step 2915, since the road link for which the master map updating request is accepted exists in the travel route of some mining dump trucks, notification that updating of the master map is inhibited is performed for the center side display unit 125.

Figure 31:
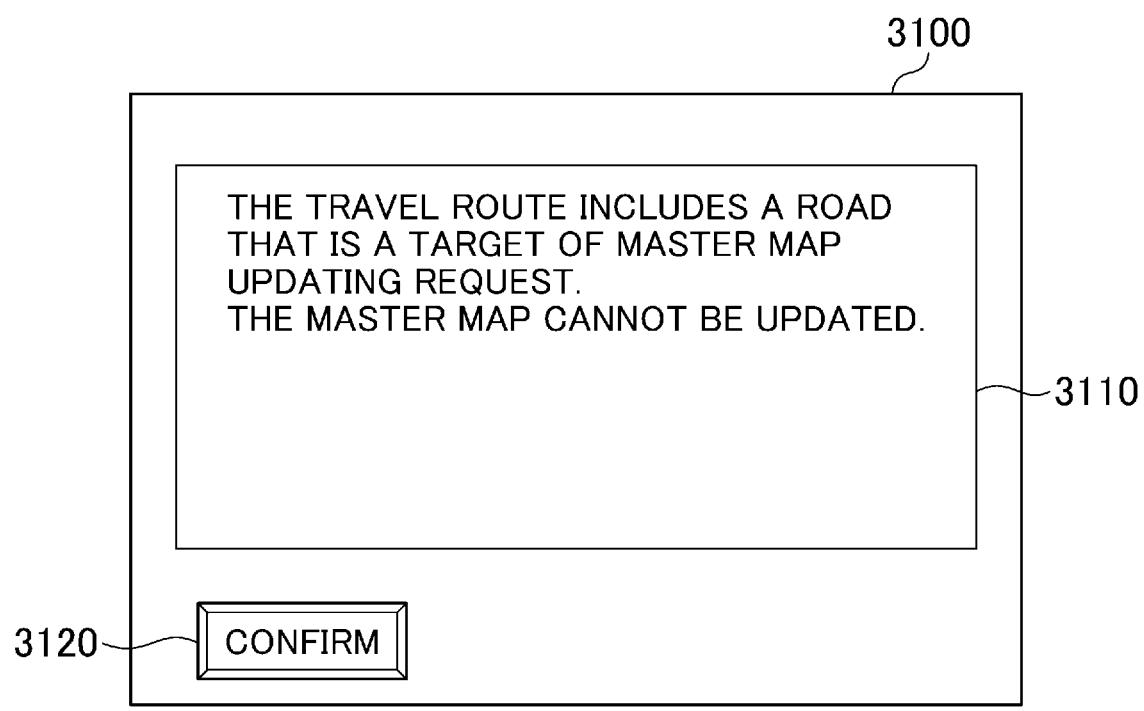
FIG. 31 is a view of a master map updating inhibition notification screen image of the third embodiment.

FIG. 31 depicts a notification screen image 3100 displayed on the center side display unit 125 at step 2915. The notification screen image 3100 for the notification of inhibition of master map updating depicted in FIG. 31 is a screen image for the notification that updating of the master map is impossible. The notification screen image 3100 includes a dialog box 3110 for displaying a message "The travel route includes a road that is a target of master map updating request. The master map cannot be updated." and a confirmation button 3120 for inputting that confirmation of the message by an operator is completed. By the notification screen image 3100 for the notification of inhibition of master map updating, the operator is notified that the master map cannot be updated because the travel route of some mining dump trucks includes a road link for which a master map updating request is accepted.

On the other hand, if it is decided at step 2910 that the road link for which the master map updating request is accepted is not included in the travel route of any mining dump trucks, then the processes at the steps from step 935 to step 960 are performed. However, the processes are same as those in the map updating process flow of the control center system 100 in the first embodiment, and therefore, description of them is omitted herein. Further, the map updating process flow of the automotive terminal system 150 in the third embodiment is same as the map updating process flow of the automotive terminal system 150 in the first embodiment, and therefore, also description of this is omitted herein.

In the third embodiment configured in such a manner as described above, in order to decide whether or not an updating request for the map data relating to a road in a mine is to be permitted, the inside of the mine is partitioned by "travel routes of mining dump trucks" that are one or more closed regions, and when a travel route in which a road link relating to a map updating request is included does not exist, updating of the map data based on the map updating request is permitted. Consequently, since the master map data and the automotive map data can be updated without stopping operation of all mining dump trucks under the control center can be updated, the working efficiency by the mining dump trucks can be improved.

Fourth Embodiment

Now, a fourth embodiment of the present invention is described. In the present embodiment, management of map data is performed in a unit of a travel route of each mining dump truck similarly as in the third embodiment. However, when a travel route that includes an updating location of map data exists, a stopping instruction is outputted to mining dump trucks to which the travel route is set to stop only the mining dump trucks, whereafter the map data are updated. After the updating of the map data is completed, a departure instruction is outputted to the mining dump trucks in the stopping state to re-start the mining dump trucks.

Figure 32:
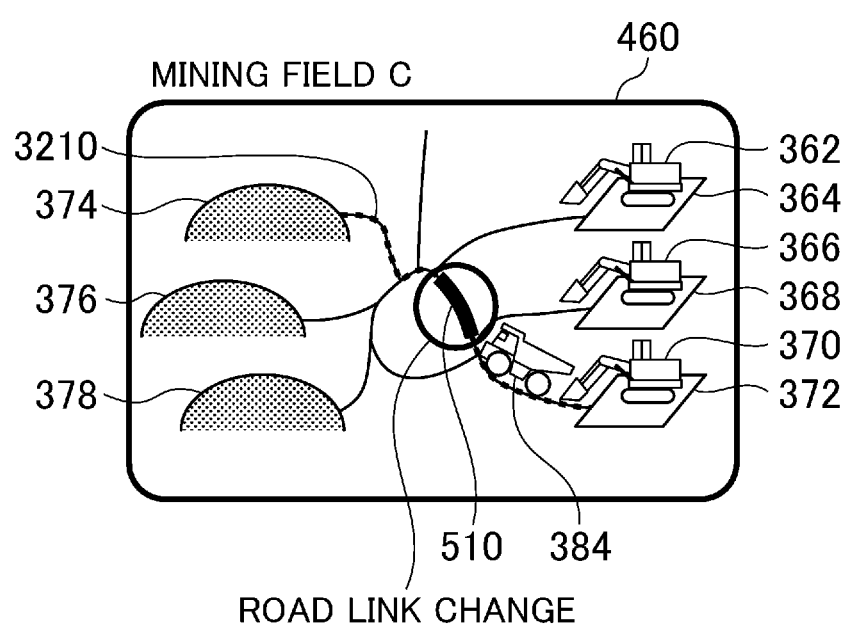
FIG. 32 is an explanatory view relating to map updating in the fourth embodiment.

A particular example of a case in which map updating is performed in the fourth embodiment is described with reference to FIG. 32. Referring to FIG. 32, a mining dump truck 384 uses a road that connects from a loading field 372 to an unloading field 374 as its travel route 3210. In this case, if a case in which it is tried to change the map data relating to the road link 510 is considered, then the travel route 3210 of the mining dump truck 384 includes the road link 510. Therefore, after the mining dump truck 384 is stopped once, the master map data of the control center system and the automotive map data of the mining dump truck 384 are updated, and after the updating comes to an end, a departure instruction of the mining dump truck 384 is outputted. Consequently, upon map updating, it is possible to perform map updating only by stopping operation of some mining dump trucks.

Figure 33:
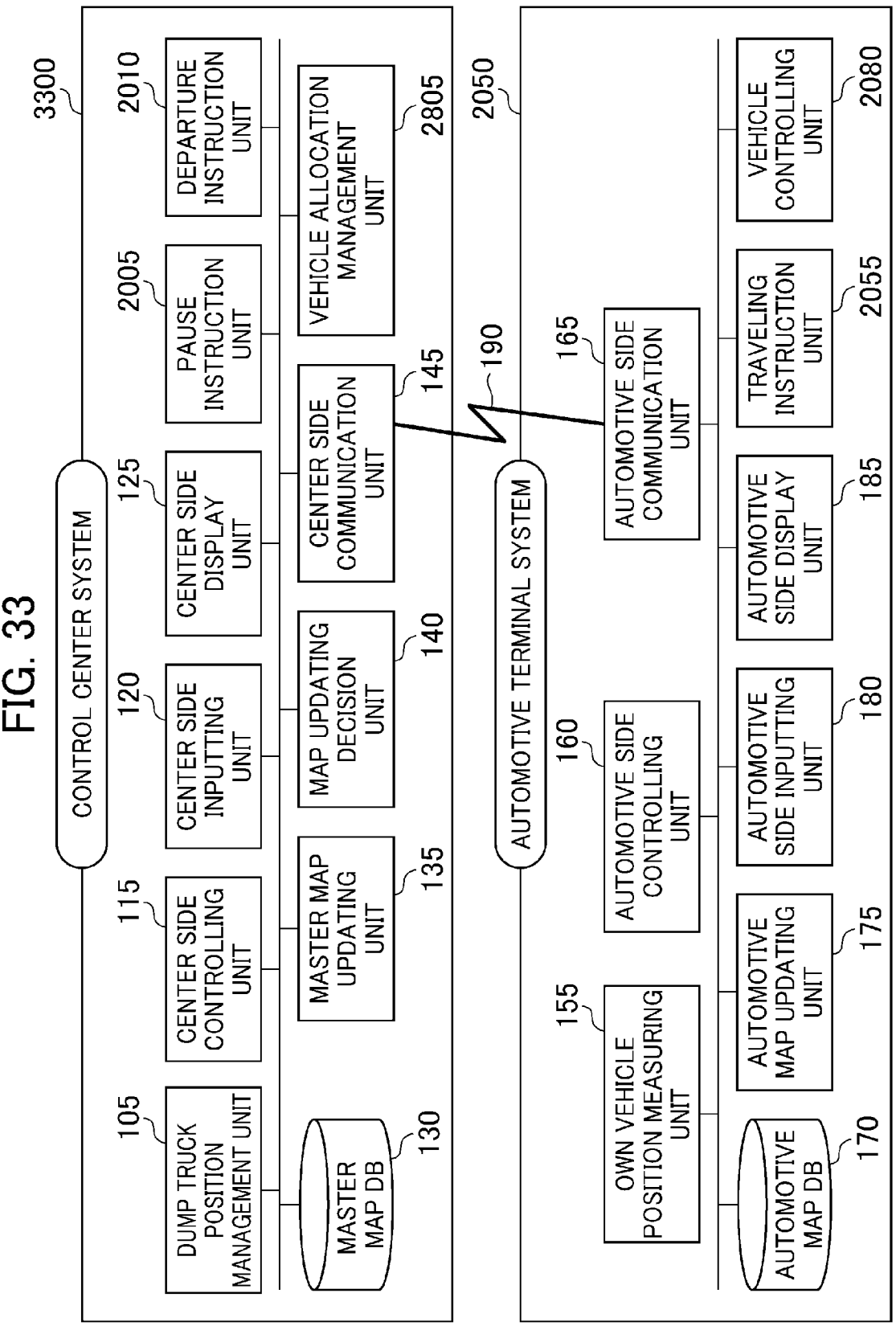
FIG. 33 is a system configuration diagram of the fourth embodiment.

A system configuration diagram of the fourth embodiment is depicted in FIG. 33. In a control center system 3300 depicted in FIG. 33, the control center system 2000 of the second embodiment additionally includes a vehicle allocation management unit 2805 for managing travel routes of the mining dump trucks. It is to be noted that the automotive terminal system in the fourth embodiment is same as the automotive terminal system 2050 of the second embodiment, and therefore, description of the automotive terminal system is omitted herein.

Figure 34:
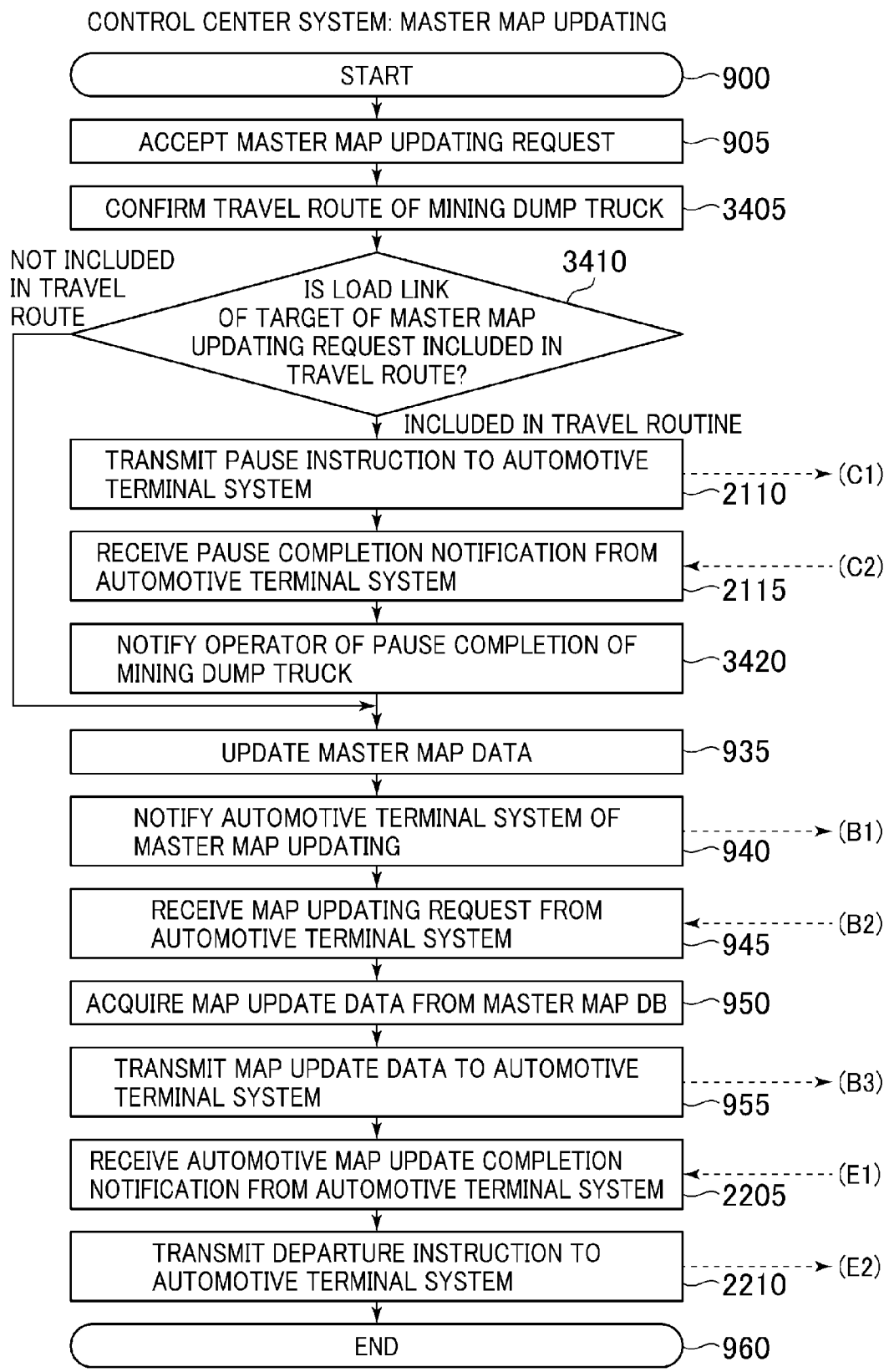
FIG. 34 is a flow chart of a map updating process flow of a control center system of the fourth embodiment.

Now, a map updating process flow of a mining dump truck by the operation management system according to the fourth embodiment is described. First, a map updating process flow of the control center system 3300 depicted in FIG. 34 is described.

In the map updating process flow of the control center system 3300 in the present embodiment, the steps from step 900 to step 905 are same as those of the map updating process flow of the control center system in the first embodiment.

After the step 905 comes to an end, the vehicle allocation management unit 2805 of the control center system 3300 acquires, at step 3405, a road link set relating to travel routes of mining dump trucks that are currently traveling from a travel route management table 3000 (refer to FIG. 30) managed by the vehicle allocation management unit 2805.

Then at step 3410, in the control center system 3300, the vehicle allocation management unit 2805 decides whether or not a road link for which a master map updating request is accepted at step 905 is included in the road link set (travel routes) acquired at step 3405. Here, if the road link for which the master map updating request is accepted is included in one of the travel routes, then the processing advances to step 2110, but if the rod link is not included in any of the travel routes, then the processing advances to step 935.

Here, the processes at the steps from step 2110 to step 2115 executed when the road link for which the master map updating request is accepted is included in one of the travel routes are same as the processes in the second embodiment, and therefore, description of the processes is omitted.

Then, after the process at step 2115 comes to an end, the control center system 3300 displays, at step 3420, on the center side display unit 125, a notification for conveying that stopping of a mining dump truck traveling on the travel route including the road link for which the master map updating request is accepted is completed. Thereafter, the processing advances to step to step 935.

Figure 35:
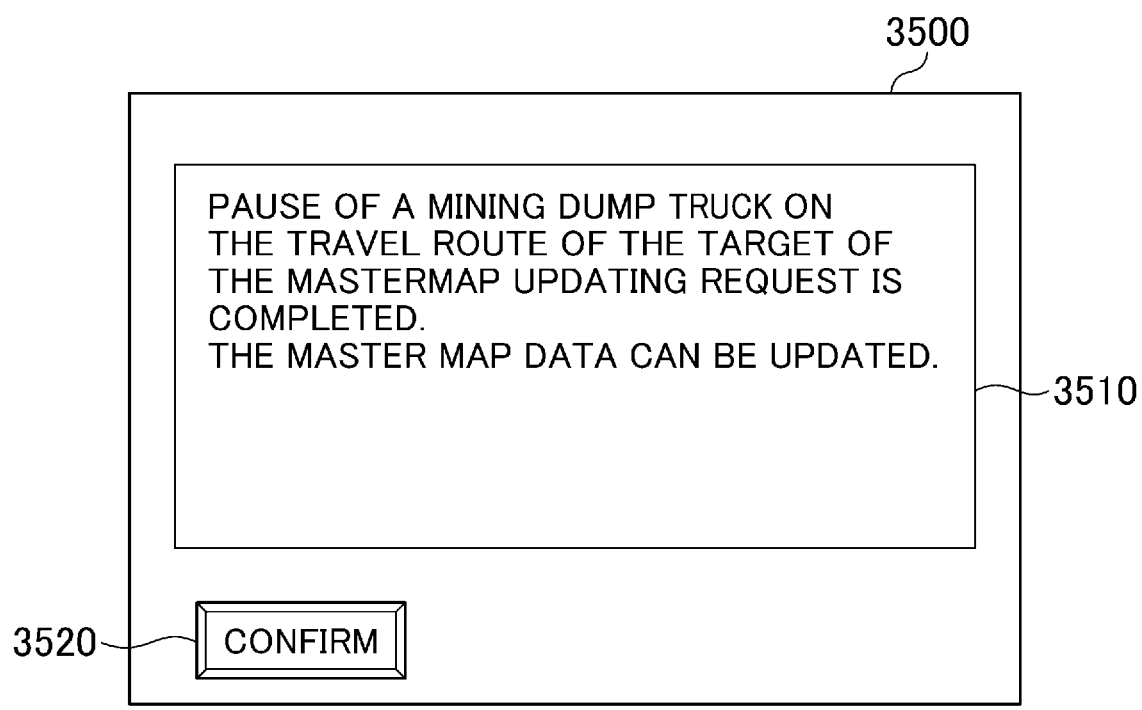
FIG. 35 is a view of a mining dump truck pause completion notification screen image of the fourth embodiment.

FIG. 35 depicts a notification screen image 3500 displayed on the center side display unit 125 at step 3420. The notification screen image 3500 depicted in FIG. 35 is a screen image for the notification that pause of a mining dump truck is completed, and includes a dialog box 3510 in which a message "Pause of a mining dump truck on the travel route of the target of the master map updating request is completed. The master map data can be updated." is displayed and a confirmation button 3520 for inputting that confirmation of the message by an operator is completed. By the notification screen image 3500, the operator is notified that pause of all mining dump trucks in which the travel route with regard to which it is tried to update the master map data is set is completed.

The processes at the steps from step 935 to step 960 are same as those in the map updating process flow of the control center system 2000 in the second embodiment, and therefore, description of the processes is omitted herein. Further, the map updating process flow of the automotive terminal system 2050 in the fourth embodiment is same as the map updating process flow of the automotive terminal system 2050 in the second embodiment, and therefore, description of the map updating process is omitted.

In the fourth embodiment configured in such a manner as described above, if a road link relating to a map updating request is included in a travel route of one of mining dump trucks, then the master map data and the automotive map data are updated after all mining dump trucks to which the travel route is set are stopped. Further, after the updating of the master map data and the automotive map data is completed, a departure instruction is outputted to the mining dump trucks in the stopping state to automatically re-start the transport work. By this, even when a mining dump truck to which a travel route relating to a map updating request is set exists, the master map data and the automotive map data can be updated only by stopping only the mining dump truck. Therefore, such a situation that all mining dump trucks existing in the mine are stopped and the working efficiency drops significantly can be prevented. Further, since the fourth embodiment is configured such that the work is re-started automatically after the updating of the map data is completed, the time for which the work stops can be held to a requisite minimum level.

Fifth Embodiment

Now, a fifth embodiment is described. In the present embodiment, management of map data is performed in a unit of a travel route of each mining dump truck similarly as in the third embodiment. However, when a travel route that includes an updating location of map data exists, the map data is updated after a new travel route is set so that a mining dump truck traveling on the travel route may not pass a road that includes the updating location.

Figure 36:
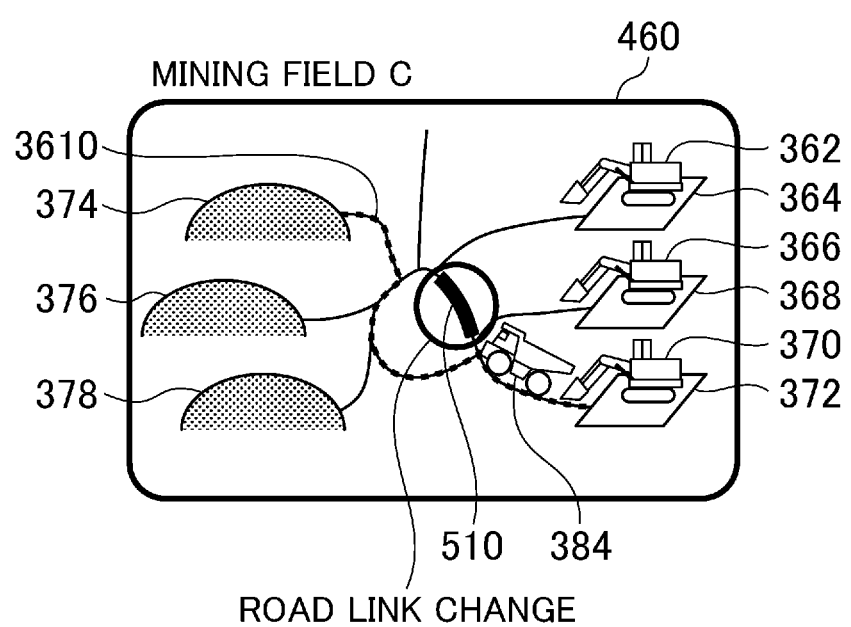
FIG. 36 is an explanatory view relating to map updating in a fifth embodiment.

A particular example of a case in which map updating is performed in the fifth embodiment is described with reference to FIGS. 32 and 36. In FIG. 32 described hereinabove, the mining dump truck 384 uses the road that connects from the loading field 372 to the unloading field 374 as the travel route 3210. In this case, if it is tried to change the map data relating to the road link 510, then the travel route 3210 of the mining dump truck 384 includes the road link 510. Therefore, as depicted in FIG. 36, a new travel route 3610 that does not include the road link 510 is set to the mining dump truck 384. Consequently, map updating can be performed without the necessity for stopping operation of all mining dump trucks upon map updating.

Figure 37:
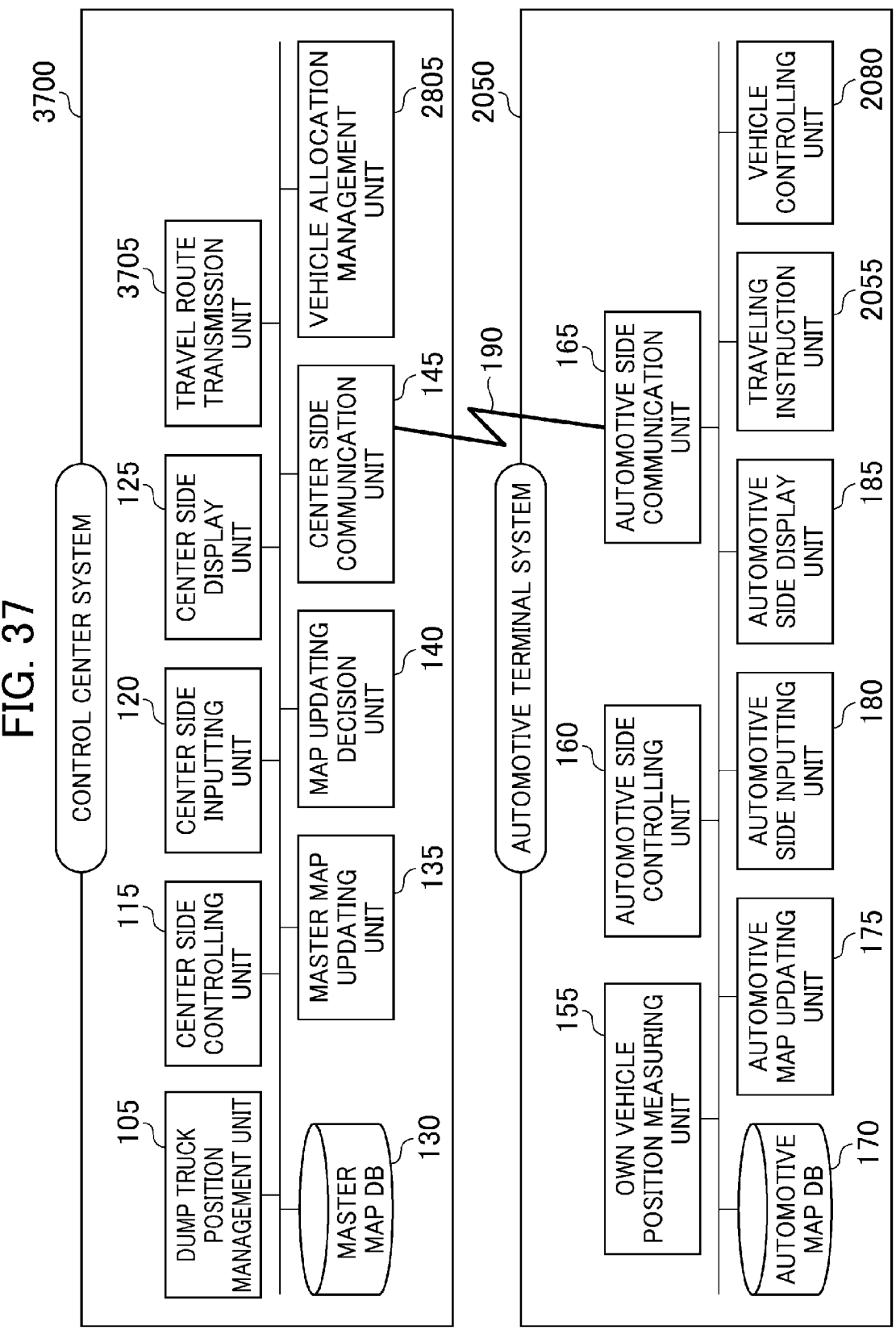
FIG. 37 is a system configuration diagram of the fifth embodiment.

A system configuration diagram in the fifth embodiment is depicted in FIG. 37. A control center system 3700 depicted in FIG. 37 corresponds to a system wherein the pause instruction unit 2005 and the departure instruction unit 2010 are deleted from the control center system 2000 of the fourth embodiment and a travel route transmission unit 3705 for transmitting a travel route that does not include a road link for which a master map updating request is accepted. Meanwhile, the automotive terminal system 2050 in the fifth embodiment is same as the automotive terminal system 2050 in the fourth embodiment, and therefore, description of the automotive terminal system 2050 is omitted.

Figure 38:
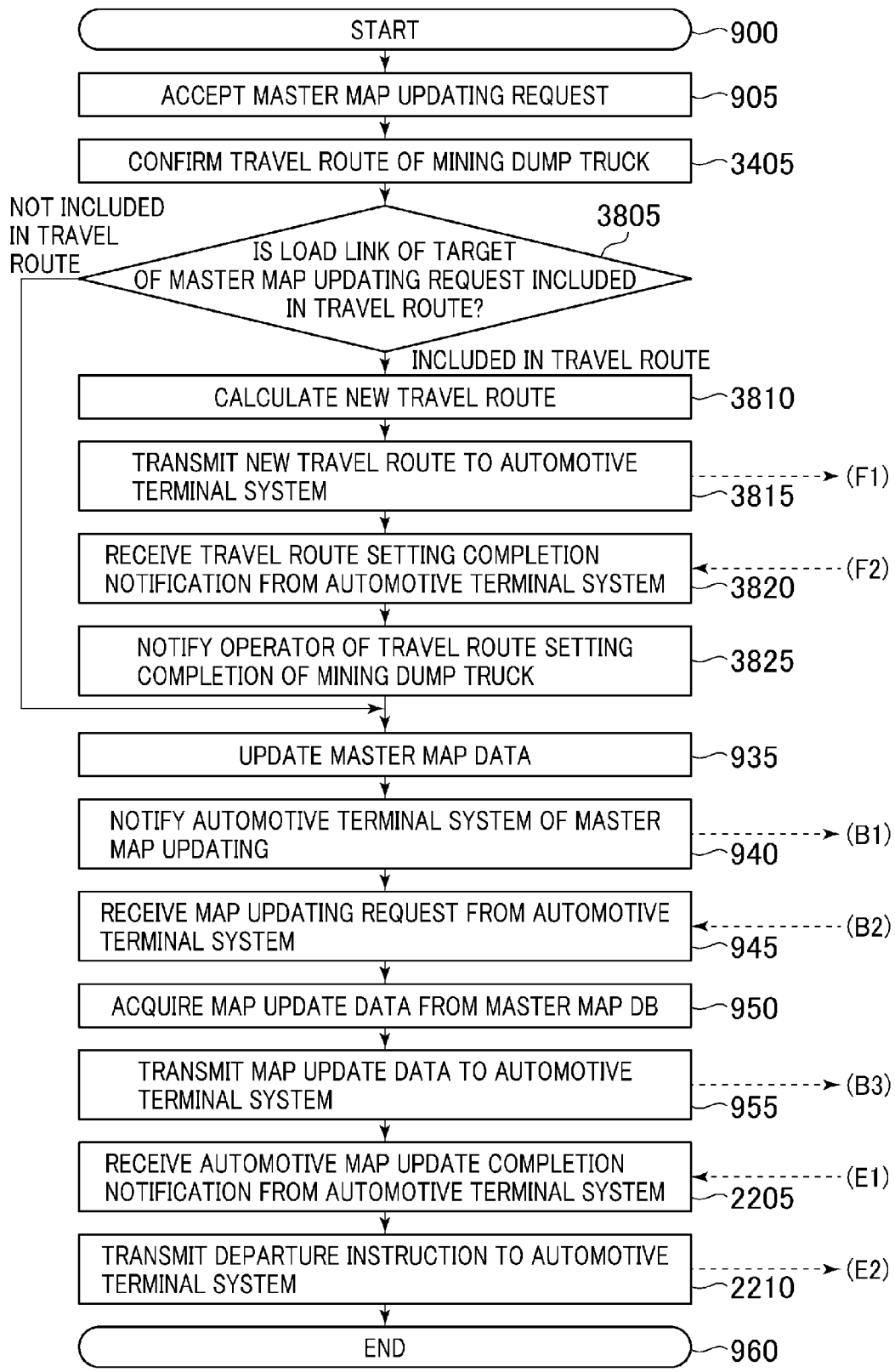
FIG. 38 is a flow chart of a map updating process flow of a control center system of the fifth embodiment.

Now, a map updating process flow of a mining dump truck by the operation management system according to the fifth embodiment is described. First, a map updating process flow of the control center system 3700 depicted in FIG. 38 is described.

In the map updating process flow of the control center system 3700 in the present embodiment, the step 900 and step 905 are same as those in the map updating process flow of the control center system 100 in the first embodiment, and the step 3405 is same as that of the map updating process flow of the control center system 3300 in the fourth embodiment. Therefore, description of the processes at the steps is omitted herein.

After the step 3405 comes to an end, the vehicle allocation management unit 2805 of the control center system 3700 decides at step 3805 whether or not a road link for which a master map updating request is accepted at step 905 is included in the road link set (travel routes) acquired at step 3405. Here, if the road link for which a master map updating request is accepted is included in one of the travel routes, then the processing advances to step 3810, but if the road link is not included in any of the travel routes, the processing advances to step 935.

At step 3810, in the control center system 3700, the vehicle allocation management unit 2805 calculates a new travel route (bypass route) that does not include the road link for which the master map updating request is accepted. As a calculation method for a new travel route, for example, a method is available wherein the shortest route from a current location to a destination is searched in the road link set from which the road link for which the master map updating request is accepted is excepted, and the shortest route is determined as a new travel route.

At step 3815, the travel route transmission unit 3705 transmits the new travel route calculated at step 3810 to the automotive side communication unit 165 of the mining dump truck whose travel route includes the road link for which the master map updating request is accepted through the center side communication unit 145. Thereafter, the processing advances to step 3820.

At step 3820, in the control center system 3700, the center side communication unit 145 receives a travel route setting completion notification transmitted from the automotive side communication unit 165. Thereafter, the processing advances to step 3825.

Then at step 3825, the control center system 3700 displays on the center side display unit 125 a notification that conveys to the mining dump truck whose travel route includes the road link for which the map updating request is accepted that the setting of a new travel route at step 3810 is completed. Thereafter, the processing advances to step 935.

Figure 39:
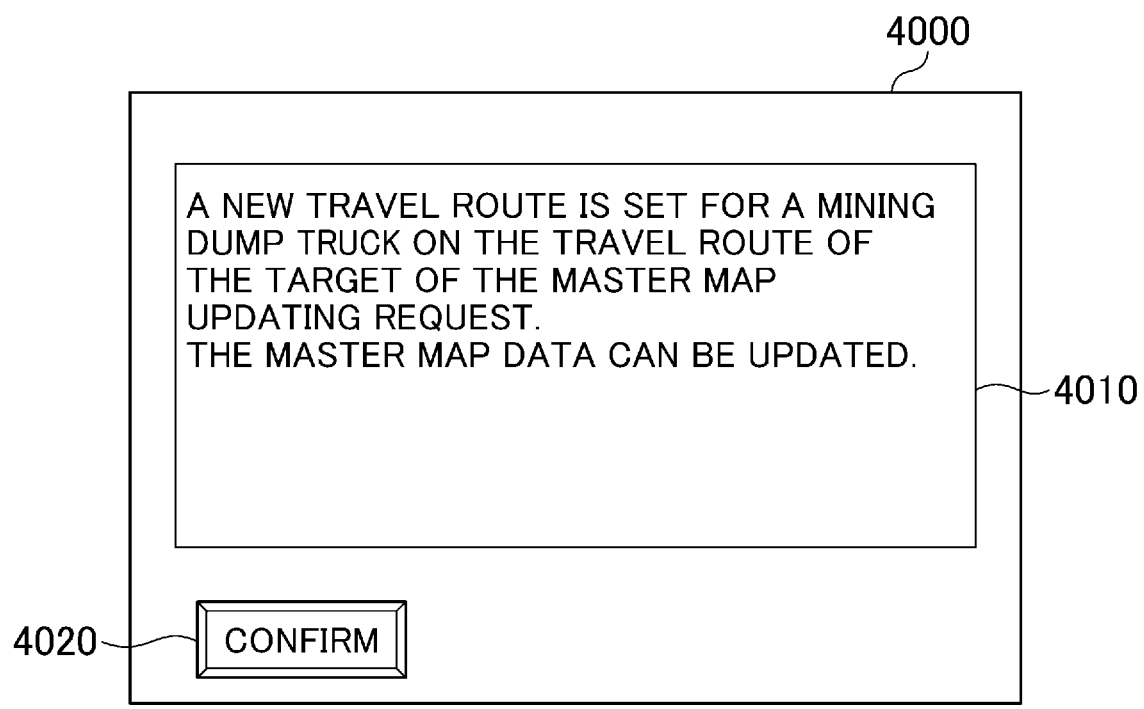
FIG. 39 is a view of a mining dump truck travel route setting completion notification screen image of the fifth embodiment.

FIG. 39 depicts a notification screen image 4000 displayed on the center side display unit 125 at step 3825. The notification screen image 4000 depicted in FIG. 39 is a screen image for conveying that setting of a new travel route is completed, and includes a dialog box 4010 in which a message "A new travel route is set for a mining dump truck on the travel route of the target of the master map updating request. The master map data can be updated." is displayed, and a confirmation button 4020 for inputting that confirmation of the message by an operator is completed. By the notification screen image 4000, the operator is notified that a travel route for a mining dump truck whose travel route includes the road link for which a map updating request is accepted is set to a new travel route that does not include the road link relating to the map updating request.

The processes at the steps from step 935 to step 955 following the step 3825, the processes at the following steps from step 2205 to step 2210, and the processes at step 960 are same as those in the map updating process flow of the control center system in the fourth embodiment. Therefore, description of the processes is omitted herein. Further, the map updating process flow of the automotive terminal system 2050 in the present embodiment is same as the map updating process flow of the automotive terminal system 2050 in the fourth embodiment, and therefore, description of the map updating process flow is omitted herein.

Figure 40:
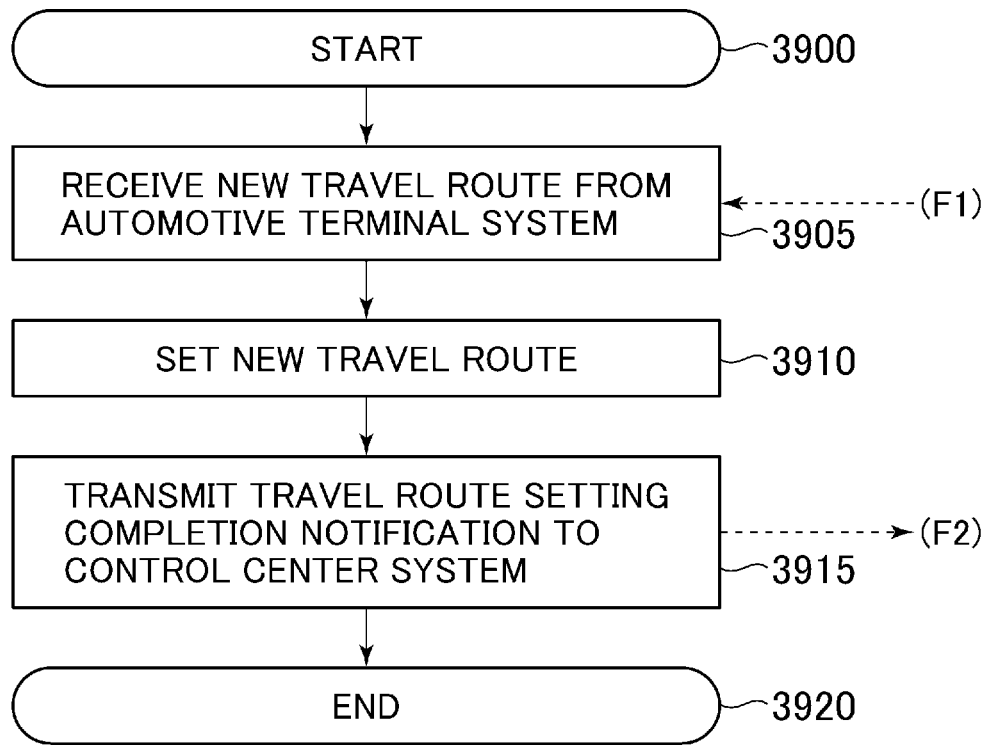
FIG. 40 is a flow chart of a travel route setting process flow of an automotive terminal system of the fifth embodiment.

Now, in relation to the processes at step 3815 and step 3820 of the control center system 3700 described above, a travel route setting process flow of a mining dump truck of the automotive terminal system 2050 in the present invention is described with reference to FIG. 40. First at step 3900, the automotive terminal system 2050 performs an initial setting process for confirming acceptance of a process start request from a user and whether or not the engine of the mining dump truck is in an ON state or the like. The process start request from the user is performed through the automotive side inputting unit 180, and if a process tart signal is accepted, then the processing advances to step 3905.

At step 3905, the automotive terminal system 2050 receives, by the automotive side communication unit 165 thereof, a new travel route transmitted from the center side communication unit 145 at step 3815. Then at step 3910, the traveling instruction unit 2055 sets the new travel route received at step 3905 as the travel route for the mining dump truck 200 to the vehicle controlling unit 2080 so that the mining dump truck 200 travels the new travel route. Then at step 3915, the automotive terminal system 2050 transmits a notification (travel route setting completion notification) representing that setting of the travel route for the mining dump truck from the automotive side communication unit 165 to the center side communication unit 145. Then at step 3920, the automotive terminal system 2050 performs an ending process for mining dump truck pause in the automotive terminal system.

In the fifth embodiment configured in such a manner as described above, if a road link relating to a map updating request is included in a travel route of one of mining dump trucks, then the mining dump to which the travel route is set is re-set so as not to pass the road link relating to the map updating request to update the master map and the automotive map data. By this, the master map data and automotive map data can be updated without stopping operation of all of the mining dump trucks under the control of the control center, and therefore, the working efficiency by the mining dump trucks can be improved.

It is to be noted that, while, in the description of the embodiments described above, a case is described in which a system is configured utilizing unmanned mining dump trucks that perform autonomous traveling, the present invention can be applied also to a case in which manned dump trucks manipulated by operators are utilized. It is to be noted that, where manned dump trucks are utilized in the second and fourth embodiments, a "stopping instruction indication" for urging an operator to perform a stopping operation of its mining dump truck may be displayed on an automotive side display unit 185 in place of the "stopping instruction" described above, and a "departure instruction indication" for urging an operator to re-start traveling of its mining dump truck may be displayed on the automotive side display unit 185 in place of the "departure instruction" described above. Further, in the fifth embodiment, a new travel route relating to step 3810 may be conveyed to an operator by displaying or the like the new travel route on the automotive side display unit 185 or the like.

Further, for the convenience of description, in the embodiments described above, the units included in the control center system are installed in the control center, and the units included in the automotive terminal system are installed in the mining dump trucks. However, the installation locations of the units of the control center system and the automotive terminal system are not limited to those in the examples described above. For example, the units relating to the control center system may be installed in the mining dump trucks. Further, where units having common functions are placed at the same place, they may be merged. For example, where the master map DB and the automotive map DB are placed at the same place, they may be merged into a map DB.

Further, the present invention is not limited to the embodiments described above and includes various modifications without departing from the spirit and scope of the present invention. For example, the present invention is not limited to a system that includes all components described in connection with the embodiments described above but includes a system in which some of the components are deleted. Further, it is possible to add or replace some of the components of a certain embodiment to or with a component of a different embodiment.

Further, the components, functions and execution processes of the components and so forth relating to the control center system and the automotive terminal system described above may be partly or entirely configured from hardware (for example, the logics for executing the functions are designed in the form of an integrated circuit or the like). Further, the components relating to the control center system and the automotive terminal system described above may be a program (software) that is read out and executed by an arithmetic processing unit (for example, a CPU) to implement the functions of the components of the control apparatus. The information relating to the program can be stored, for example, into a semiconductor memory (a flash memory, an SSD or the like), a magnetic storage device (a hard disk drive or the like), a recording medium (a magnet disk, an optical disk or the like) or the like.

Further, while, in the foregoing description of the embodiments, as control lines and information lines, those which are recognized as necessary for description of the embodiments are indicated, all control lines or information lines relating to products are not necessarily indicated. Actually, it may be considered that almost all components may be connected to each other.

DESCRIPTION OF REFERENCE NUMERALS

100: Control center system
105: Dump truck position management unit
115: Center side controlling unit
120: Center side inputting unit
125: Center side display unit
130: Master map DB
135: Master map updating unit
140: Map updating decision unit
145: Center side communication unit
150: Automotive terminal system
155: Own vehicle position measuring unit
160: Automotive side controlling unit
165: Automotive side communication unit
170: Automotive map DB
175: Automotive map updating unit
180: Automotive side inputting unit
185: Automotive side display unit
200: Mining dump truck
210: GPS antenna
220: Wireless LAN antenna
230: Cockpit of mining dump truck
300: Control center
310: Operator in control center
320: Control center system screen
400: Mine field A area
402: Mining excavator
404: Loading field
406: Mining excavator
480: Loading field
410: Mining excavator
412: Loading field
414: Unloading field
416: Unloading field
418: Unloading field
420: Mining dump truck
422: Mining dump truck
430: Mine field B area
432: Mining excavator
434: Loading field
436: Mining excavator
438: Loading field
440: Mining excavator
442: Loading field
444: Unloading field
446: Unloading field
448: Unloading field
450: Mining excavator
452: Mining excavator
460: Mine field C area
462: Mining excavator
464: Loading field
466: Mining excavator
468: Loading field
470: Mining excavator
472: Loading field
474: Unloading field
476: Unloading field
478: Unloading field
480: Mining dump truck
482: Mining dump truck
484: Mining dump truck
490: Control center
1200: Mining dump truck position management table
1300: Road shape management table
1400: Mining field area management table
1500: Speed limit management table
1600: Gradient management table
1700: Curvature management table
1800: Road surface resistance management table
1900: Master map updating inhibition notification screen image
2005: Pause instruction unit
2010: Departure instruction unit
2055: Traveling instruction unit
2080: Vehicle controlling unit
2600: Mining dump truck pause completion notification screen image
2805: Vehicle allocation management unit
3000: Travel route management table
3500: Mining dump truck pause completion notification screen image
3705: Travel route transmission unit
4000: Mining dump truck travel route setting completion notification screen image

The invention claimed is:

1. An operation management system for dump trucks, comprising:
a first computer installed in a control center and including: a first storage device storing map data indicative of a road map for dump trucks; and a first wireless communications device configured to perform communication with external terminals through a wireless communication network, the first computer configured to control updating of the map data in the first storage device;
a plurality of dump trucks; and
a plurality of slave second computers installed in the plurality of dump trucks, respectively, each of the second computers including: a second wireless communications device configured to perform communication with external terminals through the wireless communication network; and a second storage device communicatively connected with the first storage device via the second wireless communications device, the second computers are configured to respectively control updating of the map data in the second storage devices in synchronization with the map data in the first storage device,
wherein a plurality of the dump trucks travel based on the map data in the second storage devices respectively, and
wherein the first computer is further configured to permit updating of part of the map of the first storage devices when the part of the map data is not included in one or more given closed regions set in advance on the road map or when, although the part of the map data is included in any of the one or more closed regions, none of the plurality of dump trucks exists in any of the one or more closed regions.

2. The operation management system for dump trucks according to claim 1, wherein
the one or more closed regions are set as travel routes of each of the plurality of dump trucks, and
the first computer is configured to permit, upon updating of the part of the map data, updating of the part of the map data when the part of the map data is not included in any of the travel routes of the plurality of dump trucks.

3. The operation management system for dump trucks according to claim 2, wherein
the first computer is configured to, upon updating of the part of the map data, when the part of the map data is included in any of the travel routes of the plurality of dump trucks, output a stopping instruction to a dump truck to which a travel route in which the part of the map data is included is set, and then update the map data.

4. The operation management system for dump trucks according to claim 1, wherein
the first computer is configured to, upon updating of the part of the map data, when the part of the map data is included in any of travel routes of the plurality of dump trucks, modify the travel route of a dump truck to which a travel route in which the part of the map data is included is set in such a manner that the part of the map data isn't included in the travel route thereof, and then update the map data.

5. The operation management system for dump trucks according to claim 1, wherein
the one or more closed regions are a plurality of mining fields obtained by partitioning an inside of a mine into a plurality of portions, and
the first computer is configured to permit updating of the part of the map data when, upon updating of the part of the map data, none of the plurality of dump trucks exists in the mining field in which the part of the map data is included from among the plurality of mining fields.

6. The operation management system for dump trucks according to claim 5, wherein
the first computer is configured, upon updating of the part of the map data, when any of the plurality of dump trucks exists in a mining field in which the part of the map data is included from among the plurality of mining fields, to output a stopping instruction to a dump truck existing in the mining field in which the part of the map data is included, and then update the map data.

7. The operation management system for dump trucks according to claim 3, wherein
the first computer is further configured to, after completion of the updating of the map data is confirmed, output a departure instruction for restarting a stopped dump truck.

8. The operation management system for dump trucks according to claim 6, wherein
the first computer is further configured to, after completion of the updating of the map data is confirmed, output a departure instruction for restarting a stopped dump truck.

* * * * *